US011939188B2

(12) United States Patent
Hecht et al.

(10) Patent No.: US 11,939,188 B2
(45) Date of Patent: Mar. 26, 2024

(54) BRAKE, CIRCUIT ARRANGEMENT AND METHOD FOR ACTIVATING A BRAKE

(71) Applicant: CHR.MAYR GMBH + CO. KG, Mauerstetten (DE)

(72) Inventors: Martin Hecht, Kaufbeuren (DE); Martin Reichle, Kirchheim (DE)

(73) Assignee: CHR.MAYR GMBH + CO. KG, Mauerstetten (DE)

( * ) Notice: Subject to any disclaimer, the term of this patent is extended or adjusted under 35 U.S.C. 154(b) by 80 days.

(21) Appl. No.: 17/779,992

(22) PCT Filed: Nov. 18, 2020

(86) PCT No.: PCT/EP2020/082490
§ 371 (c)(1),
(2) Date: May 25, 2022

(87) PCT Pub. No.: WO2021/110413
PCT Pub. Date: Jun. 10, 2021

(65) Prior Publication Data

US 2023/0011375 A1 Jan. 12, 2023

(30) Foreign Application Priority Data

Dec. 6, 2019 (DE) ..................... 10 2019 133 376.8

(51) Int. Cl.
*B66B 5/18* (2006.01)

(52) U.S. Cl.
CPC ...................................... *B66B 5/18* (2013.01)

(58) Field of Classification Search
CPC .................................... B66B 5/18; B66B 1/32
See application file for complete search history.

(56) References Cited

U.S. PATENT DOCUMENTS 5,779,325 A * 7/1998 Diesel ................... B60T 13/683 188/170
6,193,026 B1 * 2/2001 Sevilleja ............... F16D 63/008 188/153 R (Continued)

FOREIGN PATENT DOCUMENTS

CN 108298452 A 7/2018
DE 29510168 U1 11/1995

(Continued)

OTHER PUBLICATIONS

EPO, International Search Report, PCT/EP2020082490, dated Feb. 12, 2021, 4 pgs.

*Primary Examiner* — Michael A Riegelman
(74) *Attorney, Agent, or Firm* — Chernoff, Vilhauer, McClung & Stenzel, LLP

(57) ABSTRACT

An externally powered car brake for a lift system and, for the activation thereof, a circuit arrangement with integrated stepped control of the deceleration of the car during emergency braking are proposed.
According to the invention, a braking system having the full braking force or a braking force adapted to the operating parameters and a subsequent control of the deceleration on the basis of an acceleration measurement with stepped reduction of the braking force are proposed.
The control is designed such that the deceleration of the car is always within predefined threshold values, which applies independently of the direction of travel of the lift car, independently of the drive system of the lift used, and independently of the car loading and of the friction coefficient between the brake lining and the guide rail.

20 Claims, 11 Drawing Sheets

(56) References Cited

U.S. PATENT DOCUMENTS

| | | | | |
|---|---|---|---|---|
| 8,091,355 | B2 * | 1/2012 | St. Aubin | E02F 9/2203 60/459 |
| 8,157,061 | B2 * | 4/2012 | Gremaud | B66B 1/32 188/166 |
| 10,450,165 | B2 * | 10/2019 | Kuczera | B66B 1/32 |
| 2006/0151254 | A1 * | 7/2006 | Sevilleja-Perez | B66B 5/02 187/351 |
| 2015/0191328 | A1 * | 7/2015 | Strbuncelj | B66D 5/14 187/254 |
| 2016/0221795 | A1 * | 8/2016 | Dudde | B66B 5/18 |
| 2017/0023025 | A1 * | 1/2017 | Hahn | F15B 11/08 |
| 2017/0029247 | A1 * | 2/2017 | Kuczera | B66B 5/18 |
| 2017/0029248 | A1 * | 2/2017 | Kuczera | F15B 13/0401 |
| 2017/0036888 | A1 * | 2/2017 | Ladner | B66B 5/18 |
| 2023/0011375 | A1 * | 1/2023 | Hecht | B66B 5/18 |

FOREIGN PATENT DOCUMENTS

| | | | |
|---|---|---|---|
| DE | 102012109969 | A1 | 12/2013 |
| DE | 102014111359 | A1 | 11/2015 |
| DE | 102018205633 | A1 | 10/2019 |
| DE | 102018009620 | A1 | 6/2020 |
| EP | 0997660 | B1 | 1/2006 |
| EP | 1849734 | B1 | 9/2009 |
| SU | 927705 | A1 | 5/1982 |
| WO | 2018050577 | A1 | 3/2018 |

* cited by examiner

Detail B

C-C

BRAKE, CIRCUIT ARRANGEMENT AND METHOD FOR ACTIVATING A BRAKE

The present invention relates to a brake, a circuit arrangement and a method for activating brakes, preferably for passenger lifts.

In known lift systems, a lift car which is arranged in a lift shaft and is connected to a counterweight via a supporting means is moved vertically.

The counterweight is usually dimensioned such that it corresponds to the mass of the half-loaded lift car.

The vertical movement of the lift car and of the counterweight is implemented such that the supporting means is wrapped around a traction sheave, which is usually arranged at the upper end of the lift shaft and connected to a drive motor, and is frictionally engaged with same.

Such lift systems, which are also referred to as traction lifts, are usually equipped with two mutually independent brake systems:

1. A first brake system, which acts directly on the traction sheave, acts as an operational and emergency brake.

During normal operation, this first brake system operates purely as a holding brake and holds the stationary lift car in the region of a floor. During emergency operation, for example in the event of a power failure, this first brake system operates as an emergency brake and has to bring the moving lift car safely to a standstill and hold it there, independently of the loading.

In the prior art, the applicant's document EP0997660B1 is known, for example, which describes a partly lined spring-applied brake for acting on a rotating sheave, which can form the described first brake system.

For reasons of redundancy, at least two of these partly lined spring-applied brakes are used in one lift and act together on a brake disc connected to the traction sheave.

Such traction lifts with brake systems which act on the traction sheave are widespread but reach their limits with lift systems which have very high conveying heights and/or high travel speeds. For example, considerable changes in the length of the supporting means result from temperature changes or changes in the car load and lead to position deviations and vertical oscillations of the lift car in the region of the floors.

2. A second brake system, which is also referred to as a safety gear and is arranged directly on the lift car, brakes and holds the lift car when a predefined speed is exceeded, for example if the supporting means breaks, the guide rail acting as a braking surface.

EP1849734B1 is known from the prior art and describes, inter alia, a safety gear of this type.

The safety gear described is triggered mechanically via a so-called control cable and then brings the lift car safely to a standstill.

With high conveying heights and/or high speeds, the described safety gears in combination with a control cable are technically difficult to manage.

Alternatively, there is the possibility of monitoring the speed of the lift car by means of approved electronic systems and using said systems to activate the safety gear.

Relatively high conveying heights and/or high speeds can be implemented well therewith.

However, with safety gears according to the prior art, there is still the problem, independently of the type of speed monitoring and the type of trigger, that the deceleration values which are allowed according to standards to act on the passengers in the event of emergency braking, cannot be complied with.

The permissible values are between 0.2×g and 1.0×g, and the permissible maximum values are usually considerably exceeded in practice.

WO2018050577A1 discloses a control system for the braking force of safety gears on the basis of determining the car load, by means of which improvements are possible here. The known wide spread of the friction coefficient during frictional contact between the guide rail acting as braking surface and the friction jaws is not included in this case.

Furthermore, once the safety gears have tripped, damage to the guide rails often results, which makes it necessary to repair or exchange same.

In addition, the detachment of a tripped safety gear is often very complex and not infrequently requires the use of a chain hoist. This also makes it more difficult to evacuate any persons from the car.

To expand the field of use of passenger lifts to high conveying heights and high speeds and to comply with standard specifications relating to the permissible deceleration values and to avoid the other disadvantages mentioned, brake concepts have been developed which are built entirely on the lift car and use the existing guide rails as braking surface.

Such a brake concept, which is activated via pressure media, is disclosed in DE102012109969A1.

This car brake according to the prior art combines the function of the operational brake and the safety gear for carrying out emergency braking in one unit.

The brake on the traction sheave can be omitted as a result.

Moreover, depending on the drive concept, even the traction sheave itself can be omitted, for example if the lift car is driven by means of a linear motor.

The car brake of DE102012109969A1 is constructed in a modular manner from multiple piston-cylinder systems, the braking effect is achieved by spring elements, and the brake is opened via pressure media which move the piston counter to the force of the spring elements.

The cited document DE102012109969A1 also discloses a mechanical-hydraulic deceleration control system, the braking force and thus the acceleration acting on the passengers being controlled via a spring-mass system with a connected piston.

Specific details on the practical implementation of the system are not known from the prior art.

It is therefore an object of the present invention to create a brake, a circuit arrangement and a method for activating an externally powered lift brake built onto the car in particular for managing emergency braking processes. With the aid thereof, the specified acceleration values in the event of emergency braking must firstly be complied with, with or without determining the car load beforehand and independently of the friction conditions between the guide rail and the brake linings. Secondly, it must be ensured that there is always enough braking force available on the car for it to be brought safely to a standstill and held there, which applies primarily to vertical movements but can also be applied to horizontal movements.

To this end, it is proposed, in a lift brake built onto the car, in the event of emergency braking, initially to build up a preset braking force adapted to the operating parameters or the full braking force.

It is also proposed to integrate an acceleration measurement in the circuit arrangement for activating the brake such that, when predefined threshold values of the car deceleration are exceeded, brake actuators are then activated via rapidly switching valves for controlling pressure media or via power supply modules for controlling corresponding electrical currents such that they effect a rapid reduction in the braking forces. This reduction in the braking forces can take place in a cascading manner in any desired number of switching stages. According to the invention, brake actuators can be pressure-media-operated pistons or electromagnets for electrical activation.

In this context, an acceleration measurement can be a direct measurement of the acceleration by one or more sensors or a measurement of other variables from which an acceleration value is determined. The term acceleration measurement is used below in the present application.

In the pressure-medium-operated variant, three design measures are proposed to ensure that, when the control system is used in the event of emergency braking of the lift, the threshold values of the car deceleration are complied with, that the force generated by pressure media during the control process for opening the brake does not exceed a defined value, and that there is thus sufficient braking force available for decelerating and holding the car in every operating phase:

1. using one or more stepped pistons, each having two piston faces which can be loaded independently of each other to lift and control the brake;
2. using multiple pistons, each having only one piston face to lift and control the brake;
3. using two different system pressures, which can be combined with pistons having only one or each having multiple piston faces to lift and control the brake.

The solution mentioned under 1. above can be achieved, for example, with a constant system pressure, one or more stepped pistons being necessary to adjust the forces.

In the approach presented under 2. above, two or more single-stage pistons of simple design and preferably arranged adjacently to each other in the direction of travel of the car can be used for example in combination with a system pressure.

In the solution presented under 3., the desired deceleration of the car can be implemented with a pressure reduction valve and thus two system pressures in combination with stepped or single-stage pistons.

In the electromagnetic variant, three design measures are likewise proposed to ensure that, when the control system is used in the event of emergency braking of the lift, the threshold values for the car deceleration are complied with, that the force generated by electromagnets during the control process for opening the brake does not exceed a defined value, and that there is always sufficient braking force available for decelerating and holding the car:

1. lifting and controlling the brake with one or more working magnets per brake, each working magnet having two magnet coils which can be activated independently of each other;
2. lifting and controlling the brake with multiple working magnets per brake, each working magnet having only one magnet coil which can be activated;
3. using two different system voltages or system powers which are used to lift and control the brake, these two system voltages or system powers being usable in brakes having working magnets each having only one or each having multiple coils.

The solution mentioned under 1. above can be achieved with a simple electrical activation without reducing the voltage, one or more working magnets, each having multiple magnet coils independent of each other, being necessary to adjust the forces.

In the approach presented under 2. above, two or more working magnets of simple design, each having only one magnet coil and preferably being arranged adjacently to each other in the direction of travel of the car, can be used.

With the design solution presented under 3., the desired deceleration of the car can be implemented via two different electrical voltages or different system powers, for example generated by pulse width modulation, in combination with working magnets, each having only one coil or each having two coils.

With the proposed measures, it is possible to comply with the prescribed acceleration values for emergency braking and at the same time always provide sufficient braking force for braking and holding the car even in the event of fluctuations in the operating parameters of car brakes, such as fluctuations in the friction coefficient during frictional contact between the brake lining and the guide rail and/or with different loading of the car.

Further features and details of the circuit arrangement according to the invention and of the method according to the invention can be found in the claims and in the description of the figures.

In the figures:

FIG. 1 shows the basic structure of a passenger lift of traction design according to the prior art, with a cable ratio of 1:1.

Figure 1:
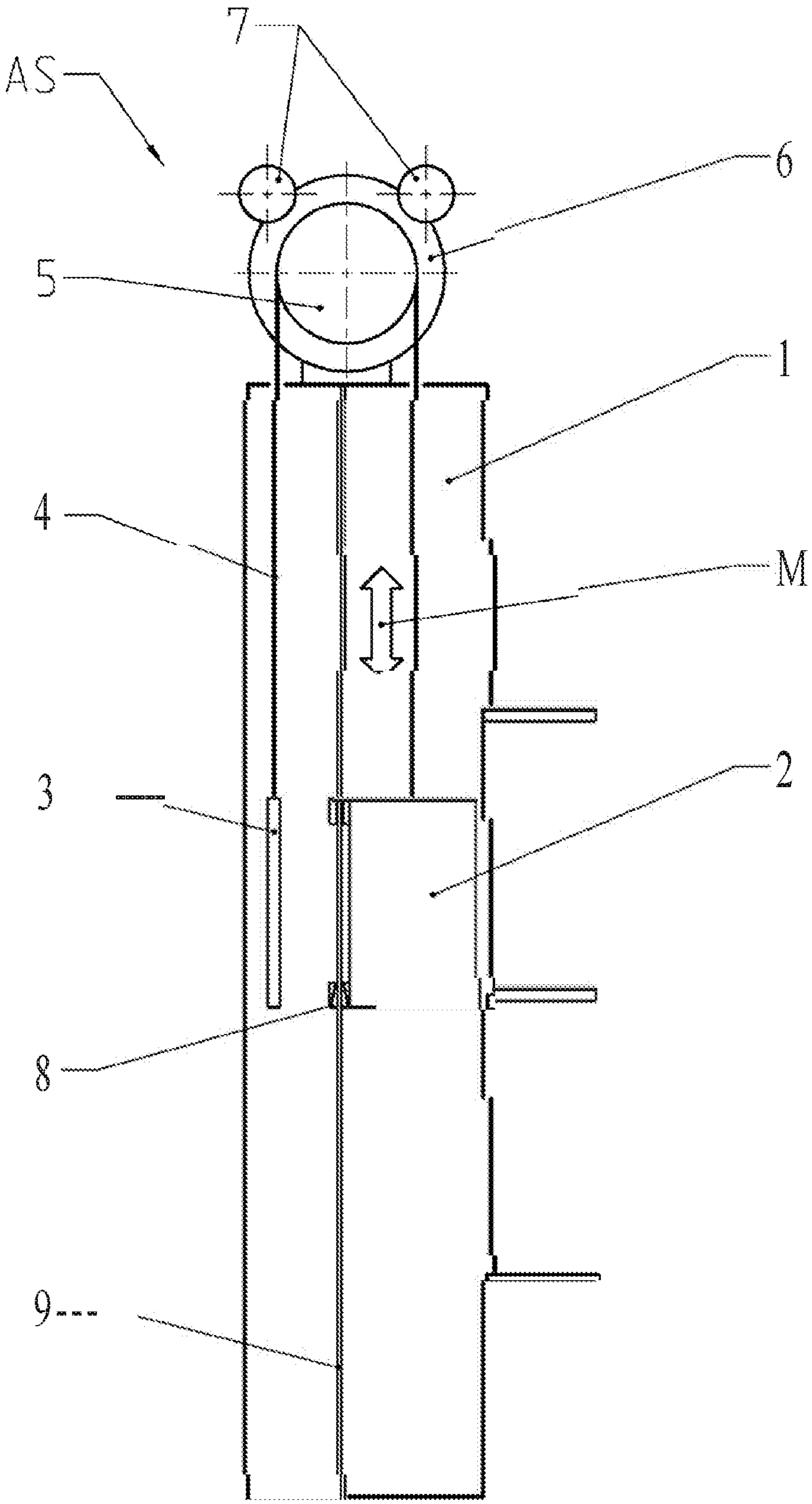
FIG. 1 shows a schematic diagram of a passenger lift according to the prior art.

A car (2) and a counterweight (3) are arranged in a lift shaft (1) and connected to each other via a supporting means (4).

The supporting means (4), which can be in the form of a group of cables or as a belt, is deflected by a traction sheave (5) and is in frictional engagement therewith.

By rotating the traction sheave (5), which is connected to a motor, a vertical movement of the car (2) and of the counterweight (3) in the lift shaft (1) is achieved in the direction of travel (M).

For safe braking and holding of the car (2) and of the counterweight (3), two independent brake systems are present in the passenger lift according to the prior art:

- a first brake system (7), which acts directly on the brake disc (6) connected to the traction sheave (5) and is formed in the example by two brake calipers for reasons of redundancy.
- The first brake system (7) is used as an operational and emergency brake.
- During normal operation, the first brake system (7) operates purely as a holding brake and holds the stationary car (2) in position in the region of a floor.
- During emergency operation, for example in the event of a power failure, this first brake system (7) operates as an emergency brake and has to bring the moving car (2) safely to a standstill and hold it there, independently of the loading state thereof.
- A second brake system (8), which is also referred to as a safety gear and is arranged directly on the car (2), brakes and holds the car (2) when a predefined speed is exceeded, the guide rail (9) acting as a braking surface.

The combination of the two brake systems in the lift according to the prior art described in FIG. 1 has the disadvantages presented in the introduction.

Figure 2:
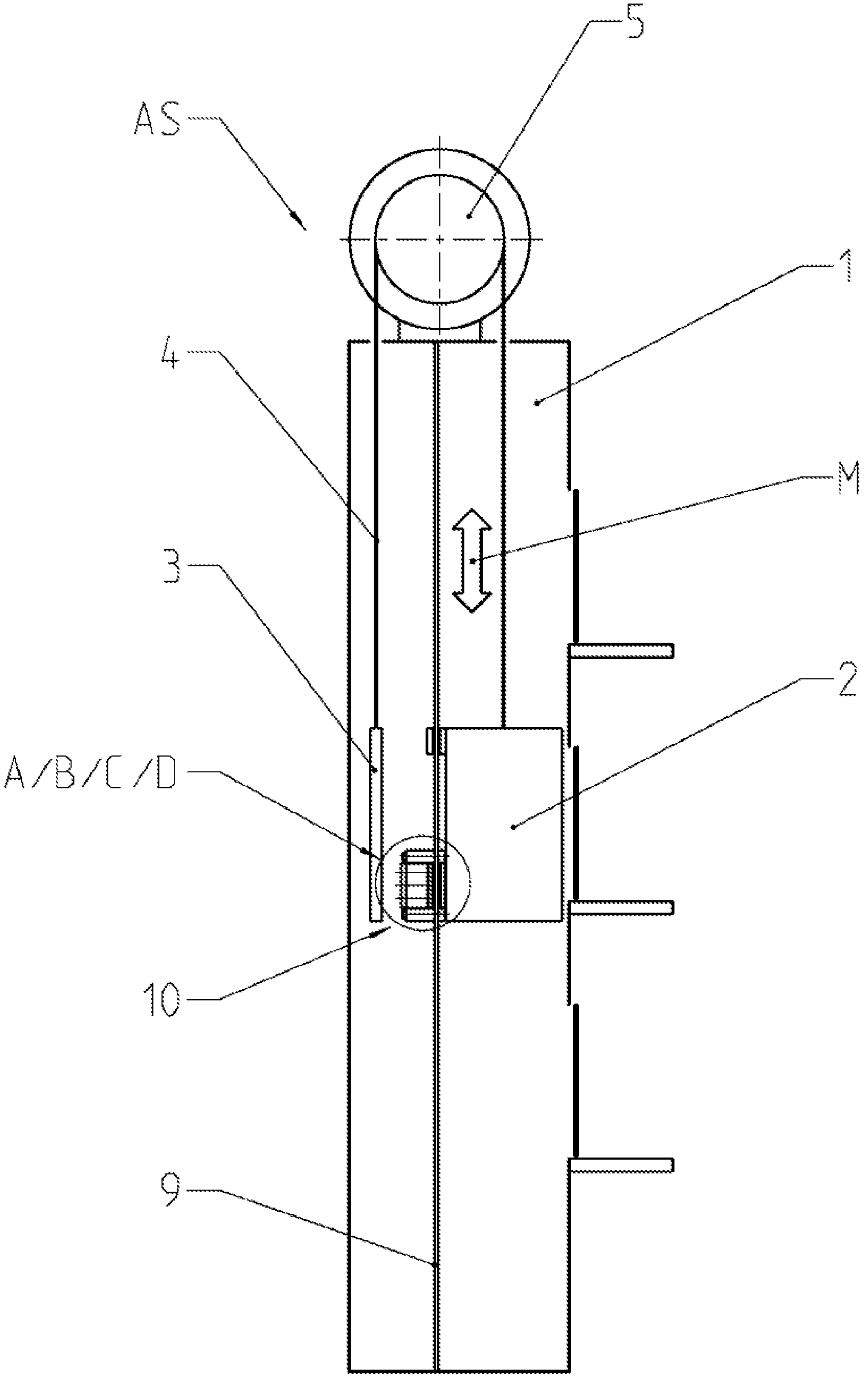
FIG. 2 shows a schematic diagram of a passenger lift having a car brake which is activated via the circuit arrangement according to the invention.

FIG. 2 shows an improved construction of a passenger lift, which combines both brake systems mentioned in the introduction in one car brake (10).

The car brake (10) is built directly onto the car (2) and uses the guide rail (9) as a braking surface.

In this case too, the car (2) and the counterweight (3) are connected via a supporting means (4), which is guided over a traction sheave (5).

By rotating the traction sheave (5), a vertical movement of the car (2) and of the counterweight (3) in the lift shaft (1) is therefore achieved in the direction of travel (M) via the supporting means (4).

Alternatively, the vertical movement of the car (2) can be implemented via a linear motor (not shown), and variants with or without counterweight (3) are possible.

It is also conceivable to move the car horizontally or to move and also brake the car in a direction deviating from the vertical or horizontal.

Figure 3:
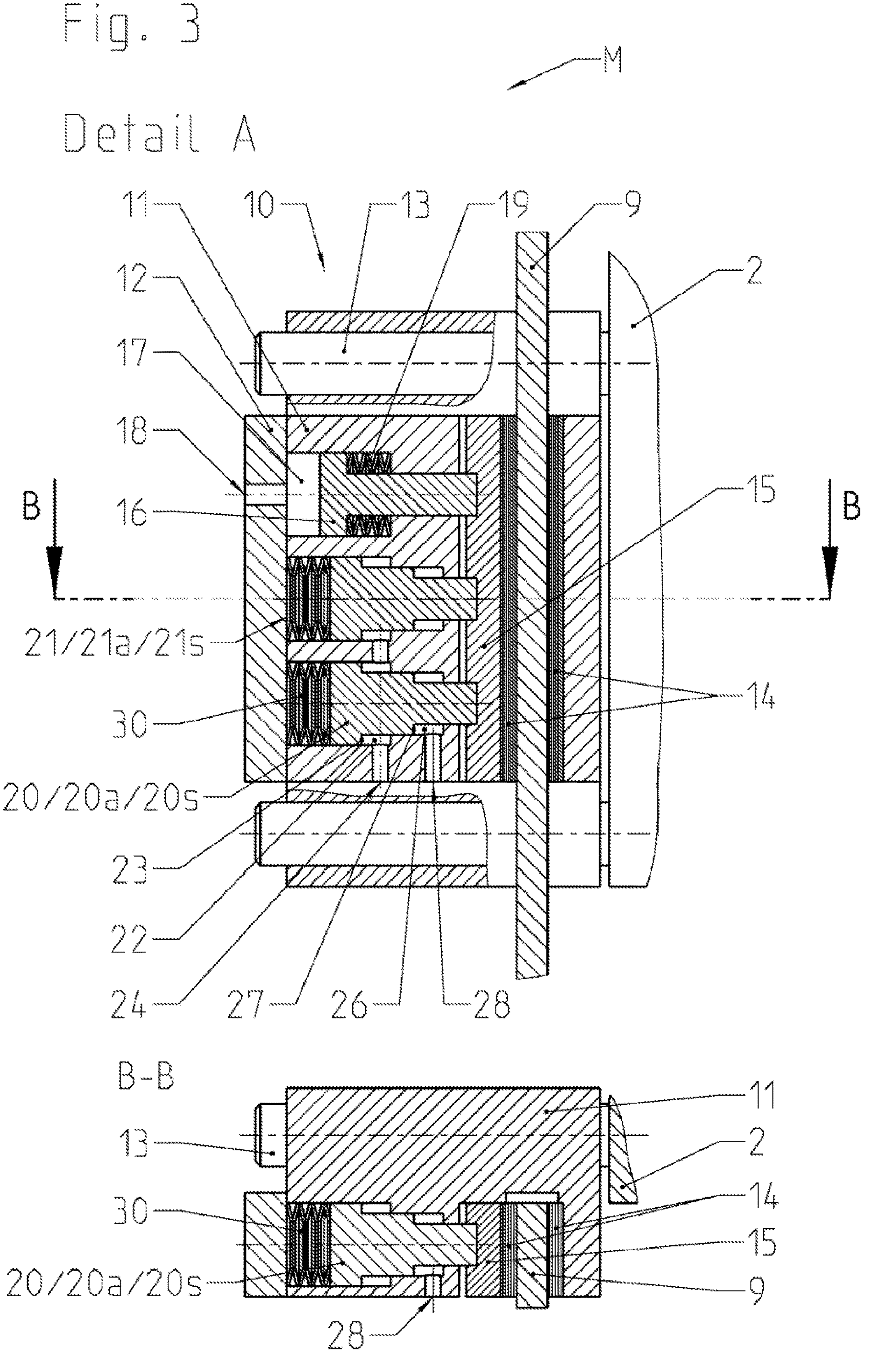
FIG. 3 shows a diagram of a first preferred embodiment of a pressure-medium-operated car brake in a detail A as a longitudinal section with a further section B-B of the car brake which is activated via the circuit arrangement according to the invention.

FIG. 3 shows a detail A from FIG. 2, which shows a longitudinal section through a first preferred embodiment of a pressure-medium-operated car brake (10) according to the invention. The car brake (10), which is shown in simplified form, is designed as a brake caliper of floating design, as is illustrated additionally in section B-B. This means that the brake housing (11) fits over the guide rail (9) in a U shape and is mounted movably transverse to the direction of travel (M) on guide elements (13).

The region of the brake housing (11) facing the car (2) is provided directly with a continuous brake lining (14) on its face facing the guide rail (9). On the side of the guide rail (9) facing away from the car (2), there is a single-part lining support (15), which is provided with a continuous brake lining (14) and is operatively connected to brake pistons (16) and stepped pistons (20$s$), which equally assume the function of control piston (20) and lifting piston (20$a$), wherein the lining support (15) with the brake lining (14) is movable transverse to the direction of travel (M) and can be brought into frictional engagement with the guide rail (9).

The car brake (10) is designed to be operated by pressure media to achieve a high power density and is divided into two functional regions:

- a first region, which acts as an operational brake and also as an emergency brake, depending on the technical design.
- This first region consists of one or more brake cylinders (17) which are arranged adjacently to each other in the direction of travel (M) of the car and accommodate brake pistons (16) therein, which are mounted movably towards the guide rail (9) transverse to the direction of travel (M). The brake cylinders (17) can be loaded with a pressure medium via a braking pressure connection (18), as a result of which the brake pistons (16) press the lining support (15) with the friction lining (14) against the guide rail (9) and thus brake the car (2) in the direction of travel (M).
- When the pressure at the braking pressure connection (18) is removed, the brake is opened again by restoring springs (19).
- The described operational brake is usually only used during normal travelling operation of the lift and acts as a holding brake for the car (2) located in the region of a floor while the passengers enter and exit. The operational brake can alternatively also be designed such that it is possible to use it as an emergency brake. To this end, the cylinder chamber (17) is provided with spring elements, which cause the brake to close, and the chamber of the restoring springs is loaded with a pressure medium, as a result of which the brake is opened. An emergency brake function is thus implemented, for example in the event of a power failure, by advantageously activating the brake with the pressure medium.
- A second region which acts purely as an emergency brake.
- This second region consists of one or more stepped cylinders (21$s$) which are arranged adjacently to each other in the direction of travel (M) of the car and equally act as control cylinder (21) and lifting cylinder (21$a$) and accommodate stepped pistons (20$s$) therein, which act analogously as control piston (20) and lifting piston (20$a$) and are mounted movably towards the guide rail (9) transverse to the direction of travel (M). On the side of the stepped pistons (20$s$) facing away from the guide rail (9) there are brake springs (30), by means of which the stepped pistons (20$s$) press the lining support (15) with the friction lining (14) against the guide rail (9) and thus brake the car (2) in the direction of travel (M).
- By application of a pressure medium to the lifting piston chambers (22) and the control piston chambers (26), a force builds up on the lifting piston faces (23) and the control piston faces (27) counter to the force of the brake springs (30), which is greater than the latter force and thus opens the brake.

This second region of the car brake (10) which acts as an emergency brake can in theory also be used as a normal operational brake for holding the car (2) in the region of a floor.

However, this has a disadvantageous effect on the service life of the brake springs (30) and must be taken into account in their design. A further reason not to use the emergency brake as an operational brake is the higher level of noise which can result from the very short switching time required.

However, low noise levels and short switching time can be combined by means of special switching measures.

Figure 4:
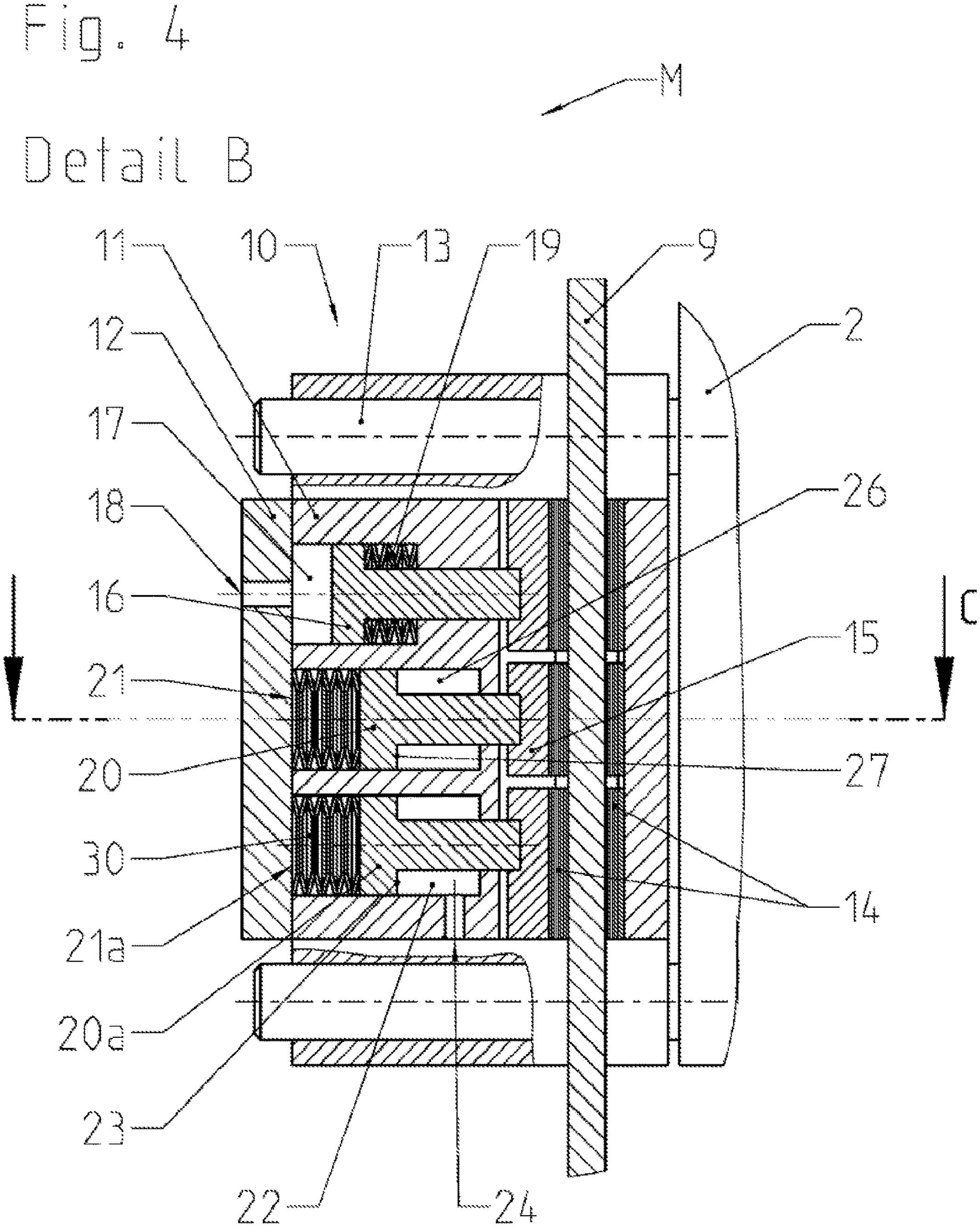
FIG. 4 shows a diagram of a second preferred embodiment of the pressure-medium-operated car brake in a detail B as a longitudinal section with a further section C-C of the car brake which is activated via the circuit arrangement according to the invention.
Figure 4:
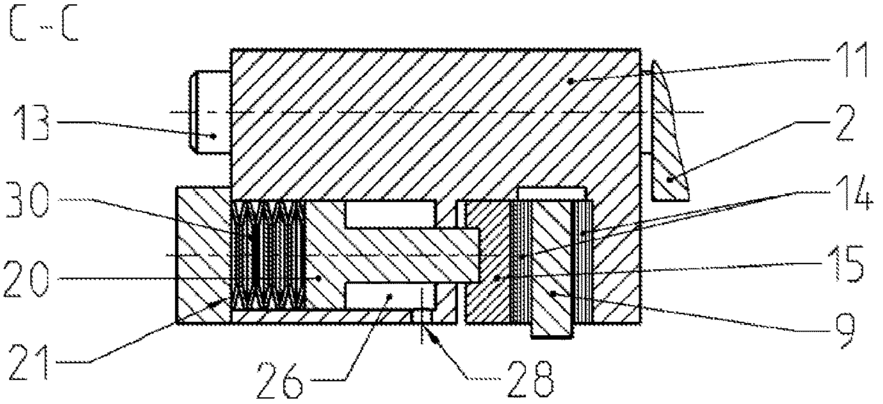

FIG. 4 shows a detail B of the pressure-medium-operated car brake (10) as a longitudinal section, which shows an alternatively preferred embodiment to FIG. 3.

The car brake (10) shown is likewise designed as a brake caliper of floating design, as is illustrated additionally in section C-C.

The region of the brake housing (11) facing the car (2) is in this case provided directly with a segmented brake lining (14) on its face facing the guide rail (9). On the side of the guide rail (9) facing away from the car (2) there are lining supports (15), which are provided with brake linings (14) and are operatively connected with brake pistons (16), lifting pistons (20*a*) and control pistons (20), wherein each brake piston (16), each lifting piston (20*a*) and each control piston (20) is assigned a lining support (15), and wherein the lining supports (15) with the brake linings (14) are movable transverse to the direction of travel (M) and can be brought into frictional engagement with the guide rail (9).

The car brake (10) is divided into two functional regions:

a first region, which acts as an operational brake and also as an emergency brake, depending on the technical design.

This first region consists of one or more brake cylinders (17) which are arranged adjacently to each other in the direction of travel (M) of the car and accommodate brake pistons (16) therein, which are mounted movably towards the guide rail (9) transverse to the direction of travel (M). The brake cylinders (17) can be loaded with a pressure medium via a braking pressure connection (18), as a result of which the brake pistons (16) press the lining support (15) with the friction lining (14) against the guide rail (9) and thus brake the car (2) in the direction of travel (M).

When the pressure at the braking pressure connection (18) is removed, the brake is opened again by restoring springs (19).

The described operational brake is usually only used during normal travelling operation of the lift and acts as a holding brake for the car (2) located in the region of a floor while the passengers enter and exit. The operational brake can alternatively also be designed such that it is possible to use it as an emergency brake. To this end, the cylinder chamber (17) is provided with spring elements, which cause the brake to close, and the chamber of the restoring springs is loaded with a pressure medium, as a result of which the brake is opened. An emergency brake function is thus implemented, for example in the event of a power failure, by advantageously activating the brake with the pressure medium.

A second region which is designed purely as an emergency brake. This second region consists of one or more control cylinders (21) which are arranged adjacently to each other in the direction of travel (M) of the car and accommodate control pistons (20) therein, only one of which is shown by way of example, and at least one lifting cylinder (21*a*) which is arranged adjacently thereto and accommodates a lifting piston (20*a*) therein. The control piston (20) and the lifting piston (20*a*) are mounted movably towards the guide rail (9) transverse to the direction of travel (M).

The control cylinder (21) and the control piston (20) together form a control piston chamber (26) with a control piston face (27).

The lifting cylinder (21*a*) and the lifting piston (20*a*) together form a lifting piston chamber (22) with a lifting piston face (23).

On the side of the control pistons (20) and of the lifting pistons (20*a*) facing away from the guide rail (9) there are brake springs (30), by means of which the control pistons (20) and the lifting pistons (20*a*) press the lining support (15) with the friction lining (14) against the guide rail (9) and thus brake the car (2) in the direction of travel (M).

By loading a control piston chamber (26) with a pressure medium which has the full system pressure, a force builds up on the control piston face (27) counter to the force of the brake springs (30), which is greater than the latter force and thus opens this part of the brake.

By loading only a part of the control piston chambers (26) with a pressure medium which has the full system pressure or by loading at least one part of the control piston chambers (26) with a pressure medium which has a reduced pressure, the braking force can be controlled during emergency braking.

This second region of the car brake (10) which acts as an emergency brake can in theory also be used as a normal operational brake for holding the car (2) in the region of a floor.

However, this has a disadvantageous effect on the service life of the brake springs (30) and must be taken into account in their design. A further reason not to use the emergency brake as an operational brake is the higher level of noise which can result from the very short switching time required. However, low noise levels and short switching time can be combined by means of special switching measures.

Figure 5:
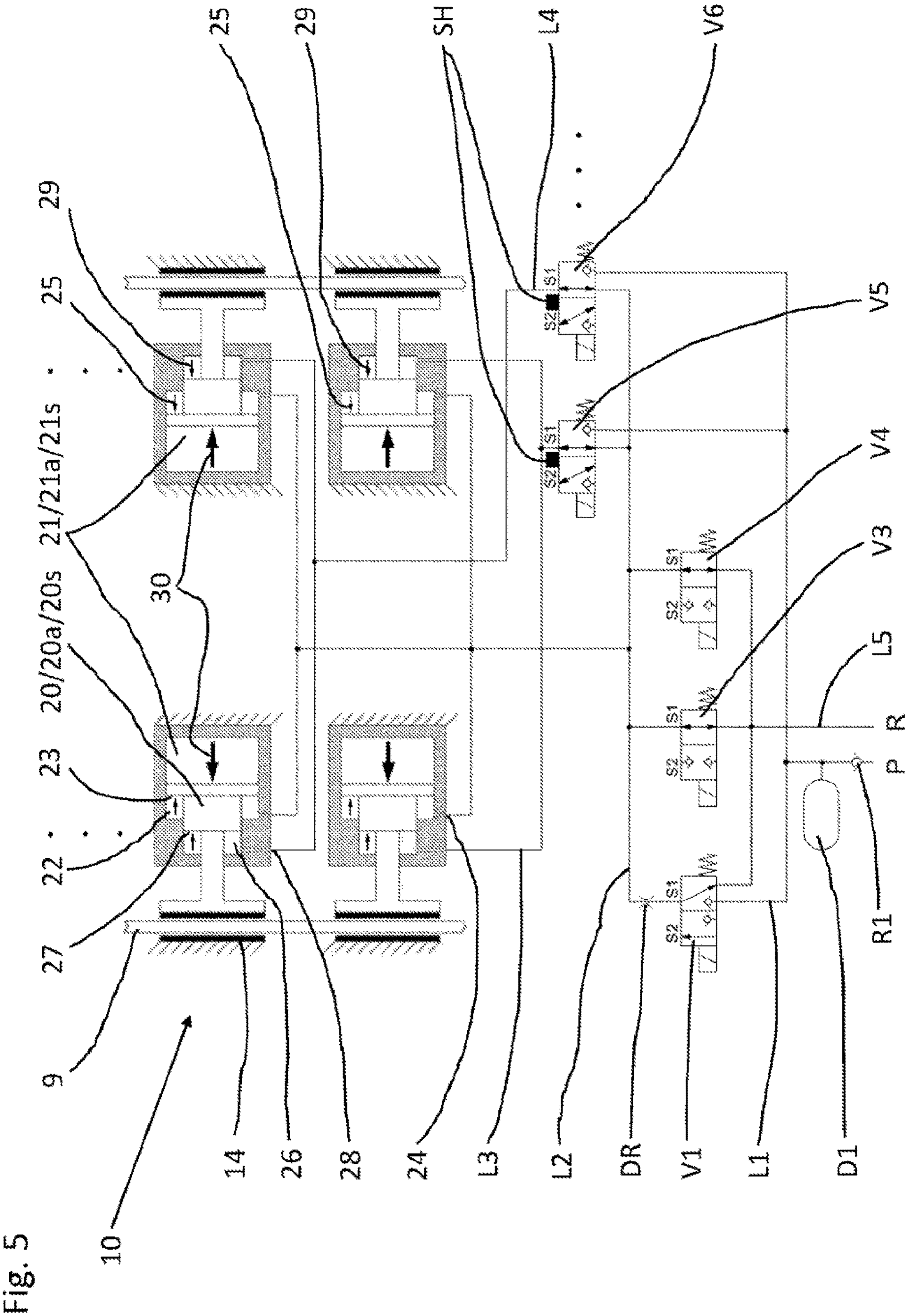
FIG. 5 shows a diagram of a first valve arrangement according to the invention with the car brake to be activated, with a two-stage control piston and a pressure reservoir.

FIG. 5 shows a first cylinder and valve arrangement for activating the emergency brake equipped with stepped cylinders (21*s*) and stepped pistons (20*s*), wherein each stepped cylinder (21*s*) assumes the function of a lifting cylinder (21*a*) and of a control cylinder (21), and each stepped piston (20*s*) covers the function of a lifting piston (20*a*) and of a control piston (20). In the diagram, the lift has two guide rails (9), to each of which a car brake (10) is assigned, each having two shown stepped cylinders (21*s*) with stepped pistons (20*s*). It is self-evident that each car brake (10) can also have a greater number of stepped cylinders (21*s*) and stepped pistons (20*s*).

For reasons of uniform distribution of the braking forces to both guide rails (9), equally effective piston chambers of the brake shown on the left and right are activated by a common line section (L2, L3, L4, Ln).

If there is only one guide rail (9) or a greater number of guide rails (9), the number of car brakes (10) can advantageously be reduced or increased accordingly.

As a result of the said form, a lifting piston chamber (22) with a lifting piston face (23) and a separate and separately activatable control piston chamber (26) with a control piston face (27) are formed between the stepped cylinder (21*s*) and the stepped piston (20*s*).

The structure of the valve arrangement is described in the direction of flow of a pressure medium starting from the pressure supply (P) via pressure reservoir and valves to the car brake (10) and from here back to the return (R). The line sections (L1 to L6, Ln) are lines for transporting the pressure medium.

The pressure supply (P) supplies the pressure medium, preferably a hydraulic fluid based on mineral or synthetic oils or on water, from where it is conveyed via a check valve (R1) into a line section (L1), from which one or more pressure reservoirs (D1) are also filled, thereby allowing a safe pressure supply to be built up.

The pressure medium passes from the line section (L1) into a line section (L2) when a magnetic directional valve (V1), which can be provided with a switch monitoring system, is in switch position (S2) and when two redundant return valves (V3, V4) are in switch position (S2).

In a preferred embodiment, two identical and identically activated return valves (V3, V4) can be combined in one valve block. Moreover, the switch states of the return valves (V3, V4) can be sensed via a switch monitoring system (SH).

Redundancy of the return valves (V3, V4) is necessary so that if one of the valves fails, safe flow of the pressure medium back to the return (R) and thus safe braking is still possible. An alternative to redundancy can be a safe valve with fault exclusion.

Furthermore, the line section (L2) is connected to the lifting piston chambers (22) via lifting pressure connections (24) and is connected to in each case one connection of the cascade control valves (V5, V6).

The cascade control valves (V5, V6) can be designed as rapidly switching seat valves or slide valves, operation can take place by means of electromagnets or other electrically activated actuators, and preferably only the two switch states "open" and "closed" are provided.

The switch times of the rapidly switching cascade control valves (V5, V6) for full switchover between the two switch positions (S1, S2) are below approximately 20 milliseconds, preferably below 10 milliseconds.

The cascade control valves (V5, V6) are designed to have the same effect, and each cascade control valve (V5, V6) activates its own piston chamber or its own group of piston chambers.

A further connection of the first cascade control valve (V5), which in a preferred embodiment has a switch monitoring system (SH), is connected via a line section (L3) and via a control pressure connection (28) to the control piston chamber (26) of the arrangement of stepped cylinder (21*s*) and stepped piston (20*s*) shown at the bottom of FIG. 5.

A further connection of the second cascade control valve (V6), which in a preferred embodiment likewise has a switch monitoring system (SH), is connected via a line section (L4) and via a control pressure connection (28) to the control piston chamber (26) of the arrangement of stepped cylinder (21*s*) and stepped piston (20*s*) shown at the top of FIG. 5.

It is conceivable to expand the number of cascade control valves (V5, V6) to a number "n" and thus activate a number of "n" systems, each consisting of stepped cylinder (21*s*) and stepped piston (20*s*).

To feed the pressure medium back to the return (R), multiple line systems are provided according to the invention:

The line section (L5) is connected to in each case one connection of the magnetic directional valve (V1) and of the return valves (V3, V4), as a result of which, with corresponding switch position of same, the line section (L2) is vented via the line section (L5) towards the return (R).

In the first switch position (S1) of the cascade control valves (V5, V6), the line sections (L3, L4) are also connected to the line section (L2) and, with corresponding switch position of the magnetic directional valve (V1) or of the return valves (V3, V4), are vented via the line section (L5) towards the return (R).

The operating principle of the valve arrangement is described below using FIG. 5 and FIG. 3, the starting state being assumed to be a system which was without a pressure supply (P), that is, pressureless and without an external power supply over a relatively long period of time.

In this state, the car (2) is at any position in the lift shaft (1) and the region of the car brake (10) acting as the emergency brake is closed by the force of the brake springs (30).

The pressure reservoir (D1) is pressureless, as are all the line sections (L1, L2, L3, L4, L5) and the pressure connections (24, 28) of the car brake (10).

The magnetic directional valve (V1), the two return valves (V3, V4) and the two cascade control valves (V5, V6) are in the first switch position (S1), the line sections (L3, L4) and the line section (L2) are connected to the line section (L5) and vented towards the return (R).

The lift system (AS) receives a call, and the car (2) should travel to another floor. Before the car (2) begins to move, the following processes, which are referred to below as starting mode 1, run within a short time in the system of the car brake (10):

The pressure supply (P) is activated, it conveys the pressure medium via the check valve (R1) into the line section (L1) and fills the pressure reservoir (D1) until a predefined system pressure is present there.

Movements of the brake piston (16) can be triggered by the controller via the brake pressure connection (18), but these are not discussed in detail here.

The magnet coil of the magnetic directional valve (V1) is energised, and the magnetic directional valve (V1) changes from the first switch position (S1) to the second switch position (S2).

At the same time, the magnet coils of the two return valves (V3, V4) are energised, and the two valves change from the first switch position (S1) to the second switch position (S2), as a result of which the connection between the line section (L5) and the line section (L2) is interrupted at the two valves.

The line section (L2) is connected to the line section (L1) via the magnetic directional valve (V1), and the pressure medium passes more slowly via the throttle valve (DR) for reducing the switching noise through the lifting pressure connections (24) into the lifting piston chambers (22) while exerting a lifting force (25) on the stepped pistons (20*s*) via the lifting piston faces (23). This lifting force (25) is not yet sufficient to overcome the brake spring force (30), and the car brake (10) is still closed.

Via the cascade control valves (V5, V6), which are in the first switch position (S1), the system pressure is conducted from the line section (L2) to the line sections (L3, L4) and to the control pressure connections (28) of the car brake (10) and generates in the control piston chambers (26) a control force (29) which acts on the control piston faces (27), is added to the already effective lifting force (25) and thus completely opens the car brake (10).

The drive then moves the car (2) to the desired floor.

When the desired floor is reached and the drive has come to a standstill, the following two options for holding the car safely at the target floor, which are referred to as normal mode 1, are possible in the system of the car brake (10):

First Option for Holding the Car by Means of the Operational Brake:

Via a valve system (not shown), a defined pressure of a pressure medium is applied to the braking pressure connection (18), and the brake piston (16) closes the car brake (10) counter to the force of the restoring springs (19).

The magnetic directional valve (V1) and the two return valves (V3, V4) remain energised in their second switch position (S2), and the system pressure prevails in the pressure reservoir (D1), as a result of which nothing changes in the pressure conditions in the region of the stepped pistons (20*s*), and as a result of which the stepped pistons (20*s*) remain in their open position counter to the force of the brake springs (30).

Second Option for Holding the Car by Means of the Emergency Brake:

The car brake does not have a separate region provided as an operational brake, or this is not used.

The two return valves (V3, V4) remain energised in their second switch position (S2), and the system pressure prevails in the pressure reservoir (D1). The magnetic directional valve (V1) is transferred to its first switch position (S1), and the pressure medium from the line sections (L4, L3, L2) flows via the throttle valve (DR) and the line section (L5) back to the return (R). As a result, all the stepped pistons (20*s*) are switched to pressureless, and the car is held by the full force of the brake springs (30).

The throttle valve (DR) ensures quiet engagement of the brake.

When the lift is called again, one of the processes referred to below as normal mode 2 can run in the system of the car brake (10):

First Option for Opening the Car Brake Via the Operational Brake:

Via a valve system (not shown), the braking pressure connection (18) is switched to pressureless, and the restoring springs (19) bring the brake piston (16) of the car brake (10) into the open position.

The magnetic directional valve (V1) and the two return valves (V3, V4) remain energised in their second switch position (S2), and the system pressure prevails in the pressure reservoir (D1), as a result of which nothing changes in the pressure conditions in the region of the stepped pistons (20*s*), and as a result of which the stepped pistons (20*s*) remain in their open position counter to the force of the brake springs (30).

Second Option for Opening the Car Brake by Means of the Emergency Brake:

The car brake does not have a separate region provided as an operational brake, or this is not used.

The two return valves (V3, V4) remain energised in their second switch position (S2), and the system pressure prevails in the pressure reservoir (D1). The magnetic directional valve (V1) is transferred to its second switch position (S2), and the pressure medium flows out of the line section (L1) via the throttle valve (DR) to the line sections (L2, L3, L4), as a result of which all the stepped pistons (20*s*) move counter to the force of the brake springs (30) and open the brake.

The throttle valve (DR) ensures quiet opening of the brake.

The drive then moves the car (2) to the desired floor.

If there is a power failure while the car is travelling, emergency braking, which is referred to below as emergency braking 1, is initiated by the car brake (10):

Even if the preferably electrically operated pressure supply (P) fails, the pressure supply of the system is still ensured for a short time via the pressure reservoir (D1).

The magnetic directional valve (V1) and the two return valves (V3, V4) move into the first switch position (S1) as a result of the absence of the supply voltage. The bypassing of the magnetic directional valve (V1) and of the throttle valve (DR) through the return valves (V3, V4) opens large flow cross-sections for rapid closing of the brake.

As a result, the line sections (L4, L3, L2) are connected to the line section (L5) and vented towards the return (R), as a result of which the lifting force (25) acting counter to the brake spring force (30) and the control force (29) drop out, and the maximum braking force is built up, and the car (2) is decelerated to the maximum extent.

At the beginning of emergency braking 1, the cascade control valves (V5, V6) are still in their first switch position (S1), as a result of which the line sections (L3, L4) are still pressureless.

During emergency braking, the cascade control valves (V5, V6) are activated via a secure power supply in combination with a secure controller and acceleration measurement. As a result, when certain threshold values for the deceleration of the car (2) are exceeded the cascade control valves (V5, V6) are transferred into the second switch position (S2) or not as required via switching logic in the manner described below.

If the deceleration is correct, both cascade control valves (V5, V6) remain in the switch position (S1).

If a first threshold of the deceleration is exceeded, one of the cascade control valves (V5, V6) is transferred into the switch position (S2).

If a second threshold of the deceleration is exceeded, both cascade control valves (V5, V6) are transferred into the switch position (S2).

Thanks to the very short switch time of the cascade control valves (V5, V6), a significant reduction in the braking force and thus in the deceleration of the car (2) can be achieved in a very short time, preferably less than 50 milliseconds.

It is likewise conceivable to activate differently sized control piston faces with the cascade control valves (V5, V6) and achieve a maximum number of control stages by advantageous staggering.

With two cascade control valves (V5, V6) the following stages are accordingly possible at most: 0-V5-V6-V5+V6. With a higher number of valves, the number of control stages increases accordingly.

Moreover, redundancy can also be achieved by increasing the number of valves and control stages.

A control force (29) directed counter to the brake spring force (30) is thus built up in none of the control piston chambers (26) or in only some of the control piston chambers (26) or in all the control piston chambers (26) and in this way the deceleration is controlled.

If the deceleration falls below a prescribed minimum owing to the switchover of the cascade control valves (V5, V6), this is detected by the acceleration measurement, and at least some of the cascade control valves (V5, V6) are transferred back into the first switch position (S1).

If the lift system (AS) is driven by means of linear motor and does not have a counterweight, no emergency braking may take place while the car (2) is travelling upwards.

In such a lift system, therefore, a cascade control valve (Vn) can also be installed in the line section (L2), so that if an emergency braking criterion is present while moving upwards, all the cascade control valves (V5, V6, Vn) are in principle transferred to the switch position (S2) and remain there for the duration of the upwardly directed emergency braking. Alternatively, when the car (2) travels upwards, the magnetic directional valve (V1), the return valves (V3, V4) and the cascade control valves (V5, V6) can also remain in their second switch position (S2). As a result, no unnecessary loads would be exerted on the passengers for the duration of the emergency braking during upward movement of the car (2).

The secure controller can be designed such that the movement direction of the car (2) is detected and that, when the car (2) starts to move downwards, all the cascade control valves (V5, V6, Vn) change into the first switch position (S1).

At the same time, the magnetic directional valve (V1) and the return valves (V3, V4) must then also change into their first switch position (S1).

Furthermore, the control of the deceleration during emergency braking can be improved further on the basis of a measurement of the car loading, carried out before the car (2) starts to travel. The measurement of the car loading can also be part of the car brake (10).

It is conceivable, for example if car loading is low, to transfer at least some of the cascade control valves (V5, V6) immediately into the switch position (S2) via the secure power supply, even before beginning to travel, in case of later emergency braking and thereby to reduce the first impact when the car brake (10) engages during emergency braking.

In particular for emergency braking while travelling downwards, the control piston face (27) of the car brake (10) can advantageously be dimensioned such that, when the full system pressure acts on the control piston face (27), the car brake does not open fully, but at least a residual braking force (=brake spring force (30) minus control force (29)) always acts on the brake linings (14).

The described control process, which is fed solely by the pressure present in the pressure reservoir (D1), takes place multiple times at very short time intervals and is concluded after a few seconds, preferably less than 2 seconds, with a car (2) with low loading preferably in less than 1 second, until the car (2) is at a standstill.

If an overspeed or another fault is detected while the car (2) is travelling, the cause of which can be for example a breakage of the supporting means (4) or a fault in the control of the drive, a cycle referred to as emergency braking 2 is triggered, in which the supply voltage (U) can be interrupted, and which then proceeds correspondingly to the described emergency braking 1.

After one of the described emergency braking processes and after the corresponding fault causes have been rectified, the system can be put back into operation according to the procedure of starting mode 1.

Figure 6:
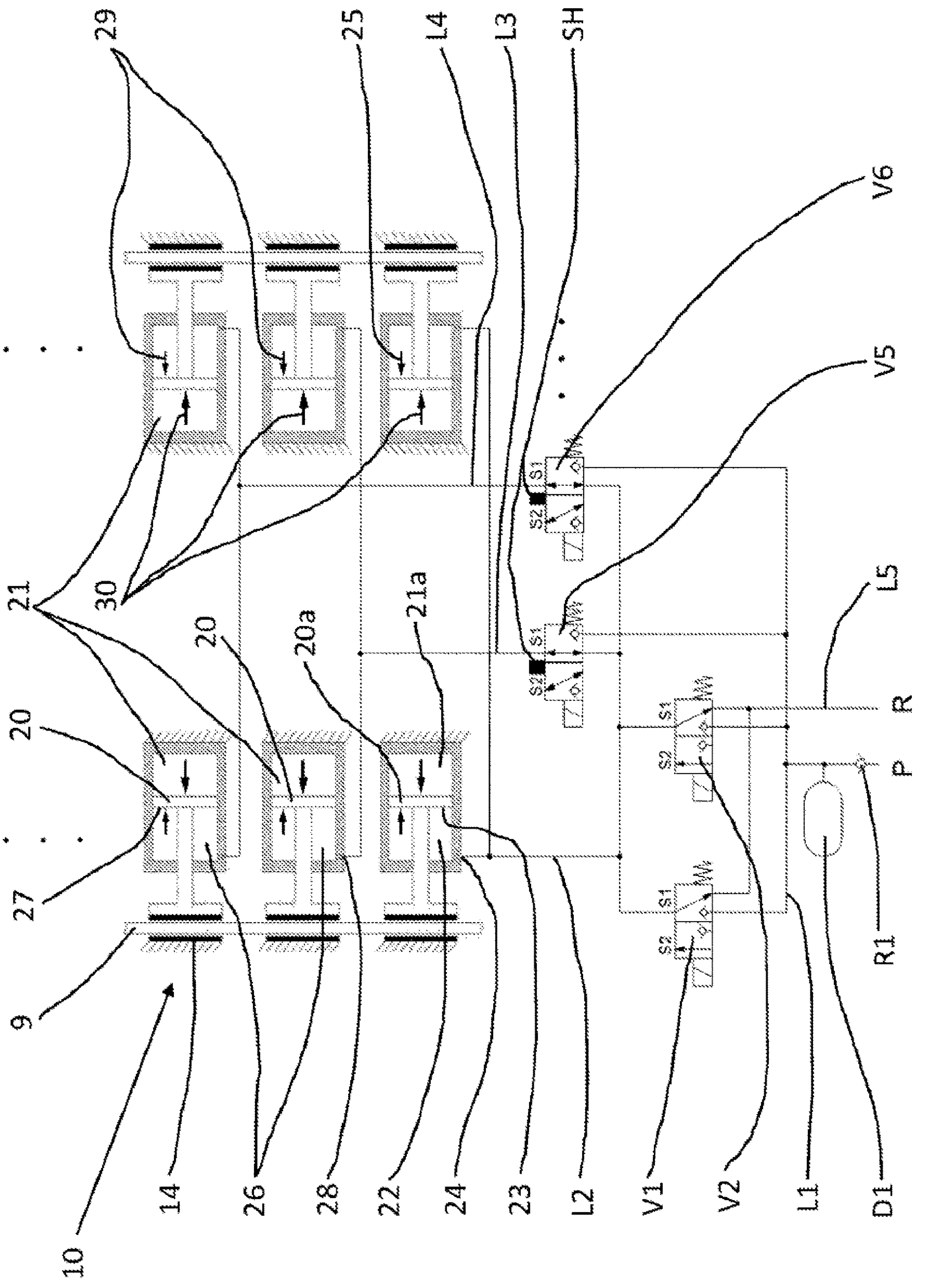
FIG. 6 shows a diagram of a second valve arrangement according to the invention with the car brake to be activated, with multiple single-stage control pistons and a pressure reservoir.

FIG. 6 shows a second cylinder and valve arrangement for activating an emergency brake equipped with single-stage control cylinders (21) and single-stage control pistons (20) according to FIG. 4.

In the diagram, the lift has two guide rails (9), each of which is assigned a car brake (10), each having two shown single-stage control cylinders (21) with single-stage control pistons (20) and in each case a single-stage lifting cylinder (21*a*) with a single-stage lifting piston (20*a*). It is self-evident that each car brake (10) can also have a greater number of control cylinders (21) and control pistons (20) as well as lifting cylinders (21*a*) and lifting pistons (20*a*).

For reasons of uniform distribution of the braking forces to both guide rails (9), equally effective piston chambers of the brake shown on the left and right are activated by a common line section (L2, L3, L4).

If there is only one guide rail (9) or a greater number of guide rails (9), the number of car brakes (10) can advantageously be reduced or increased accordingly.

Owing to the said single-stage shape of the control cylinder (21) and the control piston (20), multiple control cylinders (21) with control piston (20) and at least one single-stage lifting cylinder (21*a*) with lifting piston (20*a*) are arranged adjacently to each other in the movement direction of the car (2) in the car brake (10), the lifting cylinder (21*a*) and the lifting piston (20*a*) together forming a lifting piston chamber (22) with a lifting piston face (23).

The control cylinders (21) and the control pistons (20) together form separately activatable control piston chambers (26) with control piston faces (27).

The structure of the valve arrangement according to FIG. 6 is described in the direction of flow of a pressure medium starting from the pressure supply (P) via pressure reservoir and valves to the car brake (10) and from here back to the return (R). The line sections (L1 to L6) are lines for transporting the pressure medium.

The pressure supply (P) supplies the pressure medium, from where it is conveyed via a check valve (R1) into a line section (L1), from where a pressure reservoir (D1) is also filled.

From the line section (L1), with two redundant magnetic directional valves (V1, V2) at switch position (S2), the pressure medium passes into a line section (L2).

Redundancy of the magnetic directional valves (V1, V2) is necessary so that if one of the valves fails, safe flow of the pressure medium back to the return (R) and thus safe braking is still possible.

In a preferred embodiment, two identical and identically activated magnetic directional valves (V1, V2) are combined in one valve block, and they can have a switch monitoring system (SH), for example.

Furthermore, the line section (L2) is connected to the lifting piston chambers (22) via lifting pressure connections (24) and is connected to in each case one connection of the cascade control valves (V5, V6).

A further connection of the first cascade control valve (V5), which in a preferred embodiment has a switch monitoring system (SH), is connected via a line section (L3) and the control pressure connection (28) to the control piston chamber (26) of the arrangement consisting of control cylinder (21) and control piston (20) shown in the centre of FIG. 6.

A further connection of the second cascade control valve (V6), which in a preferred embodiment likewise has a switch monitoring system (SH), is connected via a line section (L4) and the control pressure connection (28) to the control piston chamber (26) of the arrangement of control cylinder (21) and control piston (20) shown at the top of FIG. 6.

It is conceivable to expand the number of cascade control valves (V5, V6) to a number "n" and thus activate a number of "n" systems, each consisting of control cylinder (21) and control piston (20).

To feed the pressure medium back to the return (R), multiple line systems are provided according to the invention:

The line section (L5) is connected to in each case one connection of the magnetic directional valves (V1, V2), as a result of which, with corresponding switch position of same, the line section (L2) is vented via the line section (L5) towards the return (R).

In the first switch position (S1) of the cascade control valves (V5, V6), the line sections (L3, L4) are also connected to the line section (L2) and, with corresponding switch position of the magnetic directional valves (V1, V2), are vented via the line section (L5) towards the return (R).

The operating principle of the valve arrangement is described below using FIG. 6 and FIG. 4, the starting state being assumed to be a system which was without a pressure supply (P), that is, pressureless and without an external power supply over a relatively long period of time.

In this state, the car (2) is at any position in the lift shaft (1) and the region of the car brake (10) acting as the emergency brake is closed by the force of the brake springs (30).

The pressure reservoir (D1) is pressureless, as are all the line sections (L1, L2, L3, L4, L5) and the pressure connections (24, 28) of the car brake (10). The magnetic directional valves (V1, V2) and the two cascade control valves (V5, V6) are in the first switch position (S1), the line sections (L3, L4) and the line section (L2) are connected to the line section (L5) and vented towards the return (R).

The lift system (AS) receives a call, and the car (2) should travel to another floor. Before the car (2) begins to move, the following processes, which are referred to below as starting mode 2, run within a short time in the system of the car brake (10):

The pressure supply (P) is activated, it conveys the pressure medium via the check valve (R1) into the line section (L1) and fills the pressure reservoir (D1) until a predefined system pressure is present there.

Movements of the brake piston (16) can be triggered by the controller via the brake pressure connection (18), but these are not discussed in detail here.

The magnet coils of the magnetic directional valves (V1, V2) are energised, and the magnetic directional valves (V1, V2) change from the first switch position (S1) to the second switch position (S2).

The line section (L2) is thereby connected to the line section (L1) via the magnetic directional valves (V1, V2), and the pressure medium passes through the lifting pressure connections (24) into the lifting piston chambers (22) while exerting a lifting force (25) on the lifting pistons (20*a*) via the lifting piston faces (23). This lifting force (25) is already sufficient to overcome the brake spring force (30) on the lifting piston (20*a*), but the car brake (10) is still closed owing to the brake spring force (30) still present at the control pistons (20).

Via the cascade control valves (V5, V6), which are in the first switch position (S1), the system pressure is conducted from the line section (L2) to the line sections (L3, L4) and to the control pressure connections (28) of the car brake (10) and generates in the control piston chambers (26) a control force (29) which acts on the control piston faces (27), which also completely removes the brake spring force (30) acting on the control pistons (20) and thus completely opens the car brake (10).

The drive then moves the car (2) to the desired floor.

When the desired floor is reached and the drive has come to a standstill, the following two options for holding the car safely at the target floor, which are referred to as normal mode 3, are possible in the system of the car brake (10):

First Option for Holding the Car by Means of the Operational Brake:

Via a valve system (not shown), a defined pressure of a pressure medium is applied to the braking pressure connection (18), and the brake piston (16) closes the car brake (10) counter to the force of the restoring springs (19).

The magnetic directional valves (V1, V2) remain energised in their second switch position (S2), and the system pressure prevails in the pressure reservoir (D1), as a result of which nothing changes in the pressure conditions in the region of the control pistons (20) and the lifting pistons (20*a*), and as a result of which the control pistons (20) and lifting pistons (20*a*) remain in their open position counter to the force of the brake springs (30).

Second Option for Holding the Car by Means of the Emergency Brake:

The car brake does not have a separate region provided as an operational brake, or this is not used.

The system pressure prevails in the pressure reservoir (D1) and the magnetic directional valves (V1, V2) are transferred to their first switch position (S1), and the pressure medium from the line sections (L4, L3, L2) flows via the line section (L5) back to the return (R). As a result, all the control pistons (20) and lifting pistons (20*a*) are switched to pressureless, and the car is held by the full force of the brake springs (30). Because there are no throttle valves (DR), the brake engages very rapidly however, which can lead to noise.

When the lift is called again, one of the processes referred to below as normal mode 4 can run in the system of the car brake (10):

First Option for Opening the Car Brake Via the Operational Brake:

Via a valve system (not shown), the braking pressure connection (18) is switched to pressureless, and the restoring springs (19) bring the brake piston (16) of the car brake (10) into the open position.

The magnetic directional valves (V1, V2) remain energised in their second switch position (S2), and the system pressure prevails in the pressure reservoir (D1), as a result of which nothing changes in the pressure conditions in the region of the control pistons (20) and the lifting pistons (20*a*), and as a result of which the control pistons (20) and lifting pistons (20*a*) remain in their open position counter to the force of the brake springs (30).

Second Option for Opening the Car Brake by Means of the Emergency Brake:

The car brake does not have a separate region provided as an operational brake, or this is not used.

The system pressure prevails in the pressure reservoir (D1) and the magnetic directional valves (V1, V2) are transferred to their second switch position (S2), and the pressure medium flows out of the line section (L1) to the line sections (L2, L3, L4), as a result of which all the control pistons (20) and lifting pistons (20*a*) move counter to the force of the brake springs (30) and open the brake.

Because there are no throttle valves (DR) disturbing noise can result from the rapid opening of the brake.

The drive then moves the car (2) to the desired floor.

If there is a power failure while the car is travelling, emergency braking, which is referred to below as emergency braking 3, is initiated by the car brake (10):

Even if the preferably electrically operated pressure supply (P) fails, the pressure supply of the system is still ensured for a short time via the pressure reservoir (D1).

The magnetic directional valves (V1, V2) move into the first switch position (S1) as a result of the absence of the supply voltage. Thanks to an advantageous dimensioning of the magnetic directional valves (V1, V2), large flow cross-sections are opened for rapid closing of the brake.

As a result, the line sections (L4, L3, L2) are connected to the line section (L5) and vented towards the return (R), as a result of which the lifting force (25) acting counter to the brake spring force (30) and the control force (29) drop out, and the maximum braking force is built up, and the car (2) is decelerated to the maximum extent.

At the beginning of emergency braking 1, the cascade control valves (V5, V6) are still in their first switch position (S1), as a result of which the line sections (L3, L4) are still pressureless.

During emergency braking, the cascade control valves (V5, V6) are activated via a secure power supply in combination with a secure acceleration measurement. As a result, when certain threshold values for the deceleration of the car (2) are exceeded the cascade control valves (V5, V6) are transferred into the second switch position (S2) or not as required via switching logic in the manner described below.

If the deceleration is correct, both cascade control valves (V5, V6) remain in the switch position (S1).

If a first threshold of the deceleration is exceeded, one of the cascade control valves (V5, V6) is transferred into the switch position (S2).

If a second threshold of the deceleration is exceeded, both cascade control valves (V5, V6) are transferred into the switch position (S2).

It is likewise conceivable to activate differently sized control piston faces (27) with the cascade control valves (V5, V6) and achieve a maximum number of control stages by advantageous staggering.

With two cascade control valves (V5, V6) the following stages are accordingly possible at most: 0-V5-V6-V5+V6. With a higher number of cascade control valves (V5, V6, Vn), the number of control stages increases correspondingly.

A control force (29) directed counter to the brake spring force (30) is thus built up in none of the control piston chambers (26) or in only some of the control piston chambers (26) or in all the control piston chambers (26) and in this way the deceleration is controlled.

Owing to the presence of more than two cascade control valves (V5, V6, Vn) and more than two activatable control pistons (20) per car brake (10), the number of possible switch combinations is increased, and the quality of the control is increased.

If the deceleration falls below a prescribed minimum owing to the switchover of the cascade control valves (V5, V6), this is detected by the acceleration measurement, and at least some of the cascade control valves (V5, V6) are transferred back into the first switch position (S1).

If the lift system (AS) is driven by means of linear motor and does not have a counterweight, no emergency braking may take place while the car (2) is travelling upwards.

In such a lift system, therefore, a cascade control valve (Vn) can also be installed in the line section (L2), so that if an emergency braking criterion is present while moving upwards, all the cascade control valves (V5, V6, Vn) are in principle transferred to the switch position (S2) and remain there for the duration of the upwardly directed emergency braking. Alternatively, when the car (2) travels upwards, the magnetic directional valves (V1, V2) and the cascade control valves (V5, V6) can also remain in their second switch position (S2). As a result, no unnecessary loads would be exerted on the passengers for the duration of the emergency braking during upward movement of the car (2).

The secure controller can be designed such that the movement direction of the car (2) is detected and that, when the car (2) starts to move downwards, all the cascade control valves (V5, V6, Vn) change into the switch position (S1).

At the same time, the magnetic directional valves (V1, V2) must then also change into their first switch position (S1).

Furthermore, the control of the deceleration during emergency braking can be improved further on the basis of a measurement of the car loading, carried out before the car (2) starts to travel. To this end, it is possible, for example if car loading is low, to transfer at least some of the cascade control valves (V5, V6) immediately into the switch position (S2) via the secure power supply, even before beginning to travel, in case of later emergency braking and thereby to reduce the first impact when the car brake (10) engages during emergency braking.

The described control process, which is fed solely by the pressure present in the pressure reservoir (D1), takes place multiple times at very short time intervals and is concluded after a few seconds, preferably less than 2 seconds, with a car (2) with low loading preferably in less than 1 second, until the car (2) is at a standstill.

If an overspeed is detected while the car (2) is travelling, a cycle referred to as emergency braking 4 is triggered, in which the supply voltage (U) can be interrupted and which then proceeds correspondingly to the described emergency braking 3.

After one of the described emergency braking processes and after the corresponding fault causes have been rectified, the system can be put back into operation according to the procedure of starting mode 2.

Figure 7:
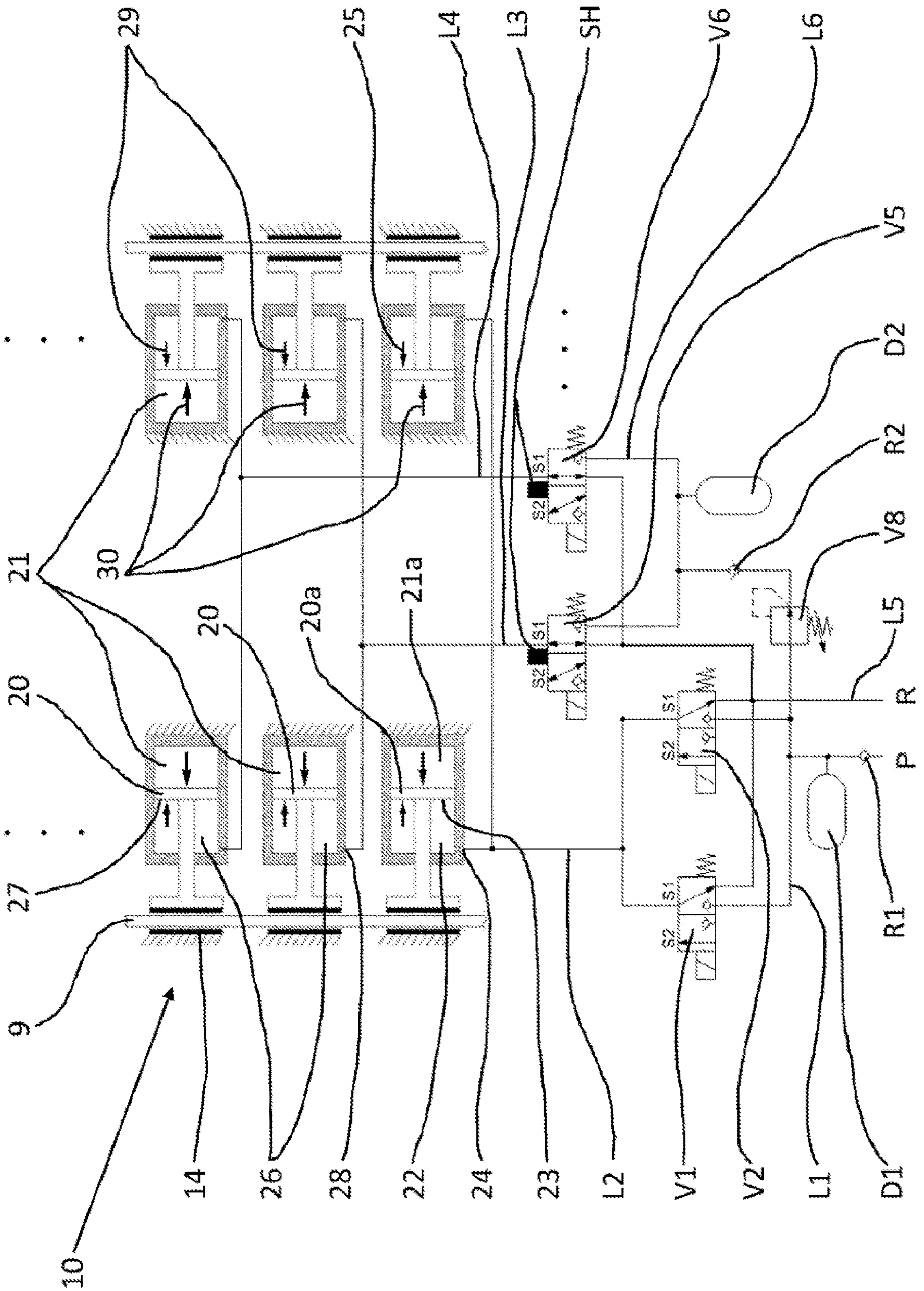
FIG. 7 shows a diagram of a third valve arrangement according to the invention with the car brake to be activated, with multiple single-stage control pistons and two pressure reservoirs.

FIG. 7 shows a third embodiment of a cylinder and valve arrangement, which largely corresponds to the arrangement of FIG. 6, but with the following differences:

The cascade control valves (V5, V6) have a direct connection to the line section (L5) connected to the return (R).

The cascade control valves (V5, V6) are not connected to the line section (L1) for permanent pressure supply but to a further line section (L6).

The line section (L6) is supplied by the line section (L1) via a pressure reduction valve (V8) and a check valve (R2), and line section (L6) has its own pressure reservoir (D2).

As a result, the cascade control valves (V5, V6) can still be supplied via the additional pressure reservoir (D2) if the pressure supply (P) fails.

The operating principle of the valve arrangement is described below using FIG. 7 and FIG. 4, the starting state being assumed to be a system which was without a pressure supply (P), that is, pressureless and without an external power supply over a relatively long period of time.

In this state, the car (2) is at any position in the lift shaft (1) and the region of the car brake (10) acting as the emergency brake is closed by the force of the brake springs (30).

The pressure reservoirs (D1, D2) are pressureless, as are all the line sections (L1, L2, L3, L4, L5, L6) and the pressure connections (24, 28) of the car brake (10).

The magnetic directional valves (V1, V2) and the two cascade control valves (V5, V6) are in the first switch position (S1), the line sections (L3, L4) and the line section (L2) are connected to the line section (L5) and vented towards the return (R).

The lift system (AS) receives a call, and the car (2) should travel to another floor. Before the car (2) begins to move, the following processes, which are referred to below as starting mode 3, run within a short time in the system of the car brake (10):

The pressure supply (P) is activated, it conveys the pressure medium via the check valve (R1) into the line section (L1) and fills the pressure reservoir (D1) until a predefined system pressure is present there.

The pressure medium flows from the line section (L1) via the pressure reduction valve (V8) and the check valve (R2) into the line section (L6) and fills the pressure reservoir (D2) there at a lower pressure than the line section (L1).

Movements of the brake piston (16) can be triggered by the controller via the brake pressure connection (18), but these are not discussed in detail here.

The magnet coils of the magnetic directional valves (V1, V2) are energised, and the magnetic directional valves (V1, V2) change from the first switch position (S1) to the second switch position (S2).

The line section (L2) is thereby connected to the line section (L1) via the magnetic directional valves (V1, V2), and the pressure medium passes through the lifting pressure connections (24) into the lifting piston chambers (22) while exerting a lifting force (25) on the lifting pistons (20*a*) via the lifting piston faces (23). This lifting force (25) is already sufficient to overcome the brake spring force (30) on the lifting piston (20*a*), but the car brake (10) is still closed owing to the brake spring force (30) still present at the control pistons (20).

The magnet coils of the cascade control valves (V5, V6) are energised, and the cascade control valves (V5, V6) change from the first switch position (S1) to the second switch position (S2), as a result of which the system pressure is conducted from the line section (L6) to the line sections (L3, L4) and to the control pressure connections (28) of the car brake (10) and generates in the control piston chambers (26) a control force (29) which acts on the control piston faces (27), which also completely removes the brake spring force (30) acting on the control pistons (20) and thus completely opens the car brake (10).

The drive then moves the car (2) to the desired floor.

When the desired floor is reached and the drive has come to a standstill, the following two options for holding the car safely at the target floor, which are referred to as normal mode 5, are possible in the system of the car brake (10):

First Option for Holding the Car by Means of the Operational Brake:

Via a valve system (not shown), a defined pressure of a pressure medium is applied to the braking pressure connection (18), and the brake piston (16) closes the car brake (10) counter to the force of the restoring springs (19).

The magnetic directional valves (V1, V2) and the cascade control valves (V5, V6) remain energised in their second switch position (S2), and the system pressure prevails in the pressure reservoirs (D1, D2), as a result of which nothing changes in the pressure conditions in the region of the control pistons (20) and the lifting piston (20*a*), and as a result of which the control pistons (20) and lifting piston (20*a*) remain in their open position counter to the force of the brake springs (30).

Second Option for Holding the Car by Means of the Emergency Brake:

The car brake does not have a separate region provided as an operational brake, or this is not used.

The system pressure prevails in the pressure reservoir (D1), and the magnetic directional valves (V1, V2) and the cascade control valves (V5, V6) are transferred to their first switch position (S1), and the pressure medium from the line sections (L4, L3, L2) flows via the line section (L5) back to the return (R). As a result, all the control pistons (20) and lifting pistons (20*a*) are switched to pressureless, and the car is held by the full force of the brake springs (30). Because there are no throttle valves (DR), the brake engages very rapidly however, which can lead to noise.

When the lift is called again, one of the processes referred to below as normal mode 6 can run in the system of the car brake (10):

First Option for Opening the Car Brake Via the Operational Brake:

Via a valve system (not shown), the braking pressure connection (18) is switched to pressureless, and the restoring springs (19) bring the brake piston (16) of the car brake (10) into the open position.

The magnetic directional valves (V1, V2) and the cascade control valves (V5, V6) are and remain energised in their second switch position (S2), and the respective system pressure prevails in the pressure reservoirs (D1, D2), as a result of which nothing changes in the pressure conditions in the region of the control pistons (20) and the lifting pistons (20*a*), and as a result of which the control pistons (20) and lifting pistons (20*a*) remain in their open position counter to the force of the brake springs (30).

Second Option for Opening the Car Brake by Means of the Emergency Brake:

The car brake does not have a separate region provided as an operational brake, or this is not used.

The system pressure prevails in the pressure reservoir (D1), and the magnetic directional valves (V1, V2) and the cascade control valves (V5, V6) are transferred from the first switch position (S1) to their second switch position (S2), and the pressure medium flows out of the line sections (L1, L6) to the line sections (L2, L3, L4), as a result of which all the control pistons (20)

and lifting pistons (20*a*) move counter to the force of the brake springs (30) and open the brake.

Because there are no throttle valves (DR) disturbing noise can result from the rapid opening of the brake.

The drive then moves the car (2) to the desired floor.

If there is a power failure while the car is travelling, emergency braking, which is referred to below as emergency braking 5, is initiated by the car brake (10):

Even if the preferably electrically operated pressure supply (P) fails, the pressure supply of the system is still ensured for a short time via the pressure reservoirs (D1, D2).

The magnetic directional valves (V1, V2) and the cascade control valves (V5, V6) move into the first switch position (S1) as a result of the absence of the supply voltage. Thanks to an advantageous dimensioning of the magnetic directional valves (V1, V2) and the cascade control valves (V5, V6), large flow cross-sections are opened for rapid closing of the brake.

As a result, the line sections (L4, L3, L2) are connected to the line section (L5) and vented towards the return (R), as a result of which the lifting force (25) acting counter to the brake spring force (30) and the control force (29) drop out, and the maximum braking force is built up, and the car (2) is decelerated to the maximum extent.

At the beginning of emergency braking 1, the cascade control valves (V5, V6) are still in their first switch position (S1), as a result of which the line sections (L3, L4) are still pressureless.

During emergency braking, the cascade control valves (V5, V6) are activated via a secure power supply in combination with a secure acceleration measurement. As a result, when certain threshold values for the deceleration of the car (2) are exceeded the cascade control valves (V5, V6) are transferred into the second switch position (S2) or not as required via switching logic in the manner described below.

If the deceleration is correct, both cascade control valves (V5, V6) remain in the switch position (S1).

If a first threshold of the deceleration is exceeded, one of the cascade control valves (V5, V6) is transferred into the switch position (S2).

If a second threshold of the deceleration is exceeded, both cascade control valves (V5, V6) are transferred into the switch position (S2).

It is likewise conceivable to activate differently sized control piston faces (27) with the cascade control valves (V5, V6) and achieve a maximum number of control stages by advantageous staggering.

With two cascade control valves (V5, V6) the following stages are accordingly possible at most: 0-V5-V6-V5+V6. With a higher number of valves, the number of control stages increases accordingly.

A control force (29) directed counter to the brake spring force (30) is thus built up in none of the control piston chambers (26) or in only some of the control piston chambers (26) or in all the control piston chambers (26) and in this way the deceleration is controlled. Owing to the presence of more than two cascade control valves (V5, V6, Vn) and more than two activatable control pistons (20) per car brake (10), the number of possible switch combinations is increased, and the quality of the control is increased, which can be increased further by optimisation of the pressure in the pressure reservoir (D2).

With an advantageous design of the system, the reduced pressure in section L6 is less than the pressure required for lifting the spring force (30). A reduction in the force is thus produced but no movement.

If the deceleration falls below a prescribed minimum owing to the switchover of the cascade control valves (V5, V6), this is detected by the acceleration measurement, and at least some of the cascade control valves (V5, V6) are transferred back into the first switch position (S1).

If the lift system (AS) is driven by means of linear motor and does not have a counterweight, no emergency braking may take place while the car (2) is travelling upwards.

In such a lift system, therefore, a cascade control valve (Vn) can also be installed in the line section (L2), so that if an emergency braking criterion is present while moving upwards, all the cascade control valves (V5, V6, Vn) are in principle transferred to the switch position (S2) and remain there for the duration of the upwardly directed emergency braking. Alternatively, when the car (2) travels upwards, the magnetic directional valves (V1, V2) and the cascade control valves (V5, V6) could also remain in their second switch position (S2). As a result, no unnecessary loads would be exerted on the passengers for the duration of the emergency braking during upward movement of the car (2).

The secure controller can be designed such that the movement direction of the car (2) is detected and that, when the car (2) starts to move downwards, all the cascade control valves (V5, V6, Vn) change into the switch position (S1).

At the same time, the magnetic directional valves (V1, V2) must then also change into their first switch position (S1).

Furthermore, the control of the deceleration during emergency braking can be improved further on the basis of a measurement of the car loading, carried out before the car (2) starts to travel. To this end, it is possible, for example if car loading is low, to transfer at least some of the cascade control valves (V5, V6) immediately into the switch position (S2) via the secure power supply, even before beginning to travel, in case of later emergency braking and to leave it there and thereby to reduce the first impact when the car brake (10) engages during actual emergency braking.

The described control process, which is fed solely by the pressure present in the pressure reservoir (D2), takes place multiple times at very short time intervals and is concluded after a few seconds, until the car (2) is at a standstill.

If an overspeed is detected while the car (2) is travelling, a cycle referred to as emergency braking 6 is triggered, in which the supply voltage (U) can be interrupted and which then proceeds correspondingly to the described emergency braking 5.

After one of the described emergency braking processes and after the corresponding fault causes have been rectified, the system can be put back into operation according to the procedure of starting mode 3.

Figure 8:
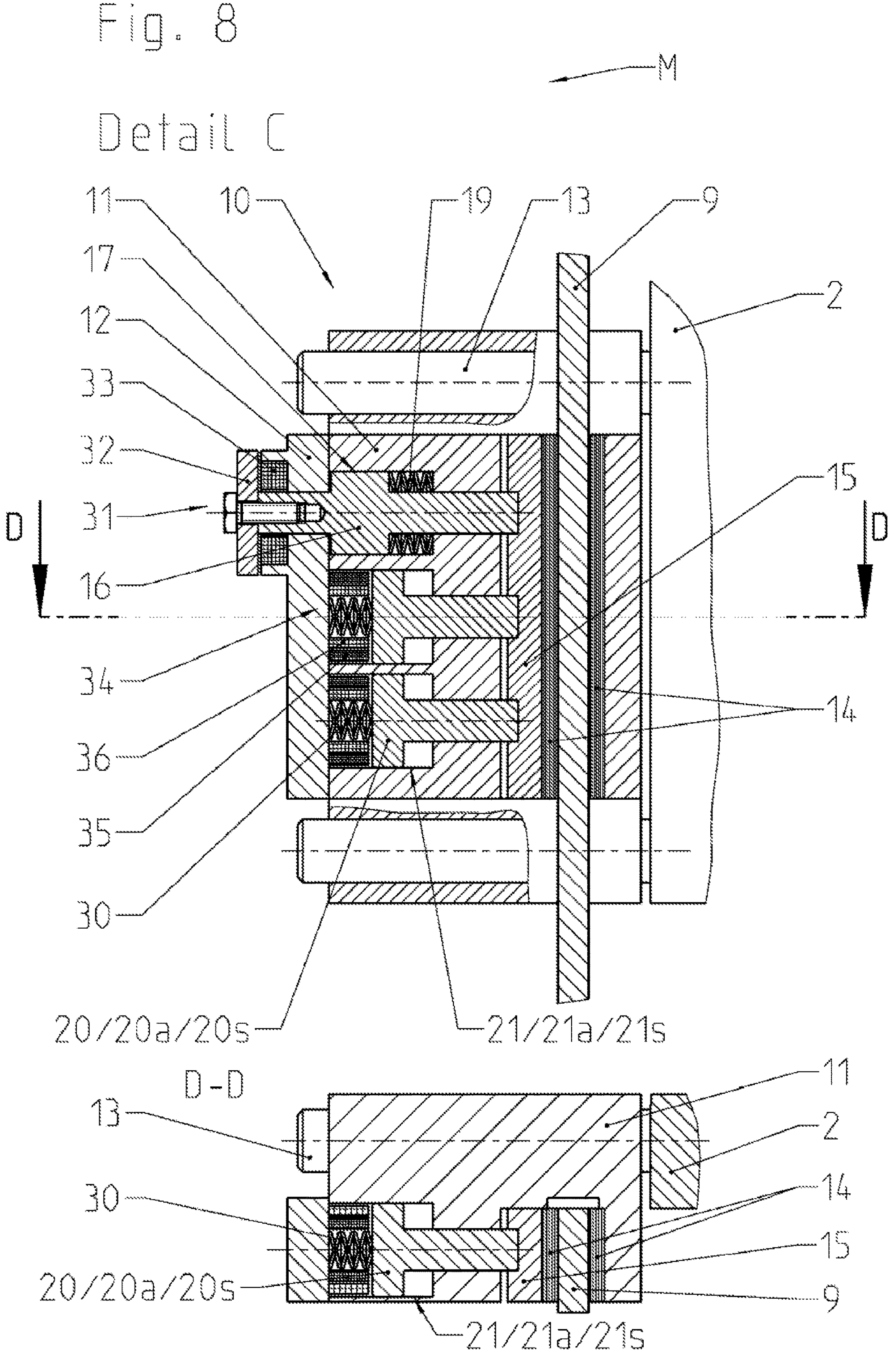
FIG. 8 shows a diagram of a first preferred embodiment of an electrically operated car brake in a detail C as a longitudinal section with a further section D-D of the car brake which is activated via the circuit arrangement according to the invention.

FIG. 8 shows a detail C from FIG. 2, which shows a longitudinal section through a first preferred embodiment of an electrically operated car brake (10) according to the invention. The car brake (10), which is shown in simplified form, is designed as a brake caliper of floating design, as is illustrated additionally in section D-D. This means that the brake housing (11) fits over the guide rail (9) in a U shape and is mounted movably transverse to the direction of travel (M) on guide elements (13).

The region of the brake housing (11) facing the car (2) is provided directly with a continuous brake lining (14) on its face facing the guide rail (9). On the side of the guide rail (9) facing away from the car (2), there is a single-part lining support (15), which is provided with a continuous brake lining (14) and is operatively connected to brake pistons (16) and stepped pistons (20*s*), which equally assume the function of control piston (20) and lifting piston (20*a*), wherein the lining support (15) with the brake lining (14) is movable transverse to the direction of travel (M) and can be brought into frictional engagement with the guide rail (9).

The car brake (10) is designed with electrical operation and divided into two functional regions:

a first region, which acts as an operational brake and also as an emergency brake, depending on the technical design.

This first region consists of one or more brake cylinders (17) which are arranged adjacently to each other in the direction of travel (M) of the car and accommodate brake pistons (16) therein, which are mounted movably towards the guide rail (9) transverse to the direction of travel (M).

The brake pistons (16) are connected at their end facing away from the guide rail to in each case one armature disc (32), which is attracted by a brake magnet (31) which is supplied with electric current and has a brake coil (33), as a result of which the brake pistons (16) press the lining support (15) with the friction lining (14) against the guide rail (9) and thus brake the car (2) in the direction of travel (M).

When the current supply at the brake magnet (31) is removed, the brake is opened again by restoring springs (19).

The described operational brake is usually only used during normal travelling operation of the lift and acts as a holding brake for the car (2) located in the region of a floor while the passengers enter and exit.

The operational brake can alternatively also be designed such that it is possible to use it as an emergency brake. To this end, the brake pistons (16) are designed like the stepped pistons (20*s*) shown in FIG. 8, in which a braking effect is achieved by the brake springs (30) and in which the brake is opened by energising magnet coils (35, 36). An emergency brake function can thus be implemented, for example in the event of a power failure, by advantageous electrical activation of the brake.

A second region which acts purely as an emergency brake.

This second region consists of one or more stepped cylinders (21*s*) which are arranged adjacently to each other in the direction of travel (M) of the car and equally act as control cylinder (21) and lifting cylinder (21*a*) and accommodate stepped pistons (20*s*) therein, which act analogously as control piston (20) and lifting piston (20*a*) and are mounted movably towards the guide rail (9) transverse to the direction of travel (M).

The stepped pistons (20*s*) and stepped cylinders (21*s*) in this case form the control pistons (20) and control cylinders (21) together with the magnet coils (36) and the lifting pistons (20*a*) and lifting cylinders (21*a*) together with the magnet coils (35).

On the side of the stepped pistons (20*s*) facing away from the guide rail (9) there are brake springs (30), by means of which the stepped pistons (20*s*) press the lining support (15) with the friction lining (14) against the guide rail (9) and thus brake the car (2) in the direction of travel (M).

By energisation of a first magnet coil (35) and a second magnet coil (36) of a working magnet (34), armature-disc-like thickened portions of the stepped pistons (20*s*) are attracted by the working magnets (34), and a force is built up on the stepped pistons (20*s*) counter to the force of the brake springs (30), which is greater than the latter force and thus opens the brake.

This second region of the car brake (10) which acts as an emergency brake can in theory also be used as a normal operational brake for holding the car (2) in the region of a floor.

However, this has a disadvantageous effect on the service life of the brake springs (30) and must be taken into account in their design. A further reason not to use the emergency brake as an operational brake is the higher level of noise which can result from the very short switching time required.

Figure 9:
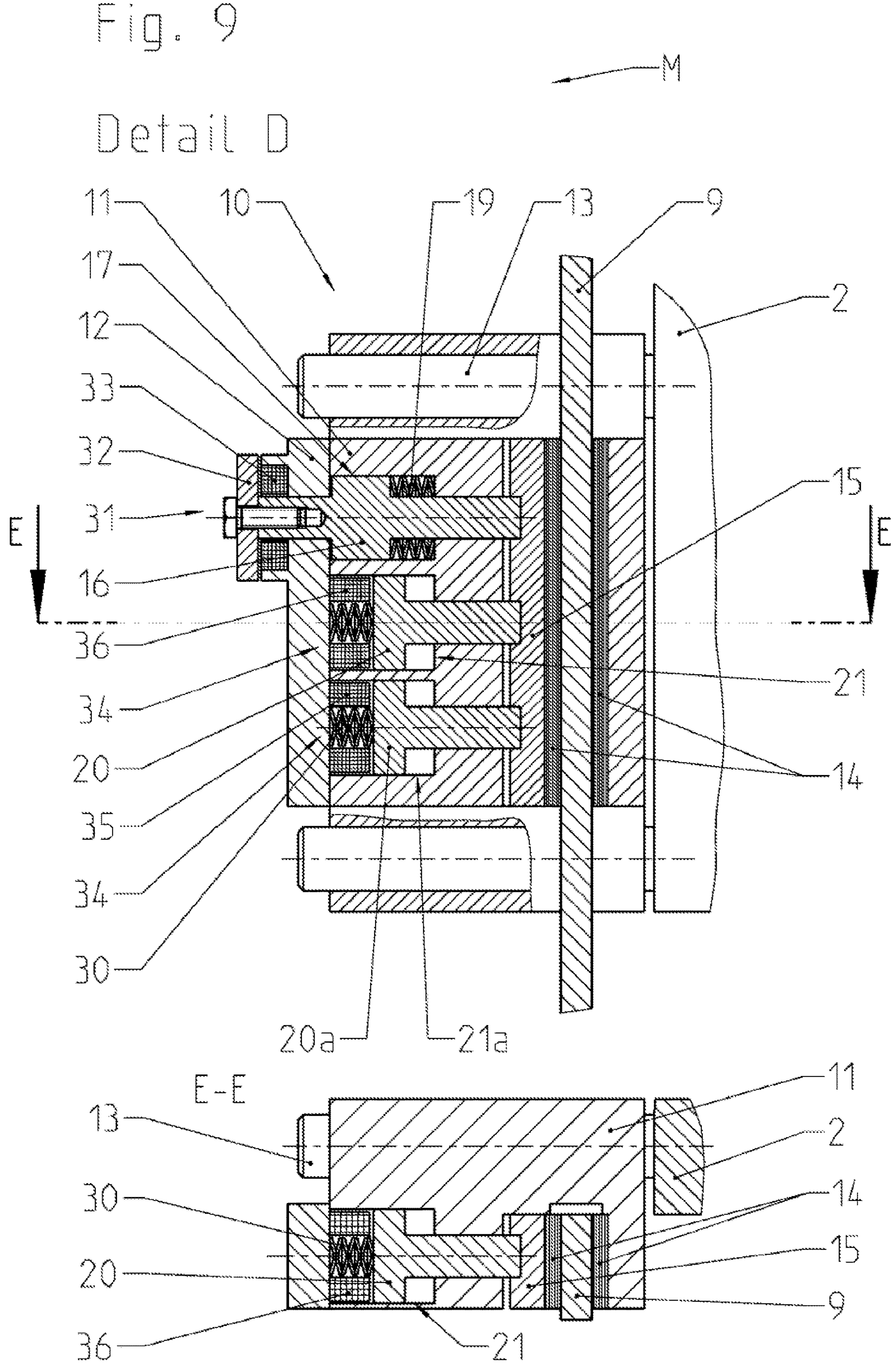
FIG. 9 shows a diagram of a second preferred embodiment of the electrically operated car brake in a detail D as a longitudinal section with a further section E-E of the car brake which is activated via the circuit arrangement according to the invention.

FIG. 9 shows a detail D from FIG. 2, which shows a longitudinal section through a second preferred embodiment of an electrically operated car brake (10) according to the invention. The car brake (10), which is shown in a highly simplified form, is designed as a brake caliper of floating design, as is illustrated additionally in section E-E. This means that the brake housing (11) fits over the guide rail (9) in a U shape and is mounted movably transverse to the direction of travel (M) on guide elements (13).

The region of the brake housing (11) facing the car (2) is provided directly with a continuous brake lining (14) on its face facing the guide rail (9). On the side of the guide rail (9) facing away from the car (2), there is a single-part lining support (15), which is provided with a continuous brake lining (14) and is operatively connected to brake pistons (16), control pistons (20) and lifting pistons (20*a*), wherein the lining support (15) with the brake lining (14) is movable transverse to the direction of travel (M) and can be brought into frictional engagement with the guide rail (9).

The car brake (10) is designed with electrical operation and divided into two functional regions:

a first region, which acts as an operational brake and also as an emergency brake, depending on the technical design.

This first region consists of one or more brake cylinders (17) which are arranged adjacently to each other in the direction of travel (M) of the car and accommodate brake pistons (16) therein, which are mounted movably towards the guide rail (9) transverse to the direction of travel (M).

The brake pistons (16) are connected at their end facing away from the guide rail to in each case one armature disc (32), which is attracted by a brake magnet (31) which is supplied with electric current and has a brake coil (33), as a result of which the brake pistons (16) press the lining support (15) with the friction lining (14) against the guide rail (9) and thus brake the car (2) in the direction of travel (M).

When the current supply at the brake magnet (31) is removed, the brake is opened again by restoring springs (19).

The described operational brake is usually only used during normal travelling operation of the lift and acts as a holding brake for the car (2) located in the region of a floor while the passengers enter and exit.

The operational brake can alternatively also be designed such that it is possible to use it as an emergency brake.

To this end, the brake pistons (16) are designed like the control pistons (20) or lifting pistons (20*a*) shown in FIG. 9, in which a braking effect is achieved by the brake springs (30) and in which the brake is opened by energising magnet coils (35, 36). An emergency brake function can thus be implemented, for example in the event of a power failure, by advantageous electrical activation of the brake.

A second region which acts purely as an emergency brake.

This second region consists of multiple control cylinders (21) which are arranged adjacently to each other in the direction of travel (M) of the car and only one of which is shown by way of example, with control pistons (20) accommodated therein, and at least one lifting cylinder (21*a*) which is arranged adjacent thereto and has lifting pistons (20*a*) accommodated therein, wherein the control pistons (20) and lifting pistons (20*a*) are mounted movably towards the guide rail (9) transverse to the direction of travel (M).

On the side of the control pistons (20) and of the lifting pistons (20*a*) facing away from the guide rail (9) there are brake springs (30), by means of which the control pistons (20) and the lifting pistons (20*a*) press the lining support (15) with the friction lining (14) against the guide rail (9) and thus brake the car (2) in the direction of travel (M).

By energisation of a magnet coil (35) of a first working magnet (34), an armature-disc-like thickened portion of the control piston (20) is attracted by the working magnet (34), and a force is built up on the control piston (20) counter to the force of the brake springs (30), which is greater than the latter force and thus opens the brake in the region of the control piston (20).

By energisation of a magnet coil (36) of a second working magnet (34), an armature-disc-like thickened portion of the lifting piston (20*a*) is attracted by the working magnet (34), and a force is built up on the lifting piston (20*a*) counter to the force of the brake springs (30), which is greater than the latter force and thus also opens the brake in the region of the lifting piston (20*a*).

This second region of the car brake (10) which acts as an emergency brake can in theory also be used as a normal operational brake for holding the car (2) in the region of a floor.

However, this has a disadvantageous effect on the service life of the brake springs (30) and must be taken into account in their design. A further reason not to use the emergency brake as an operational brake is the higher level of noise which can result from the very short switching time required.

Figure 10:
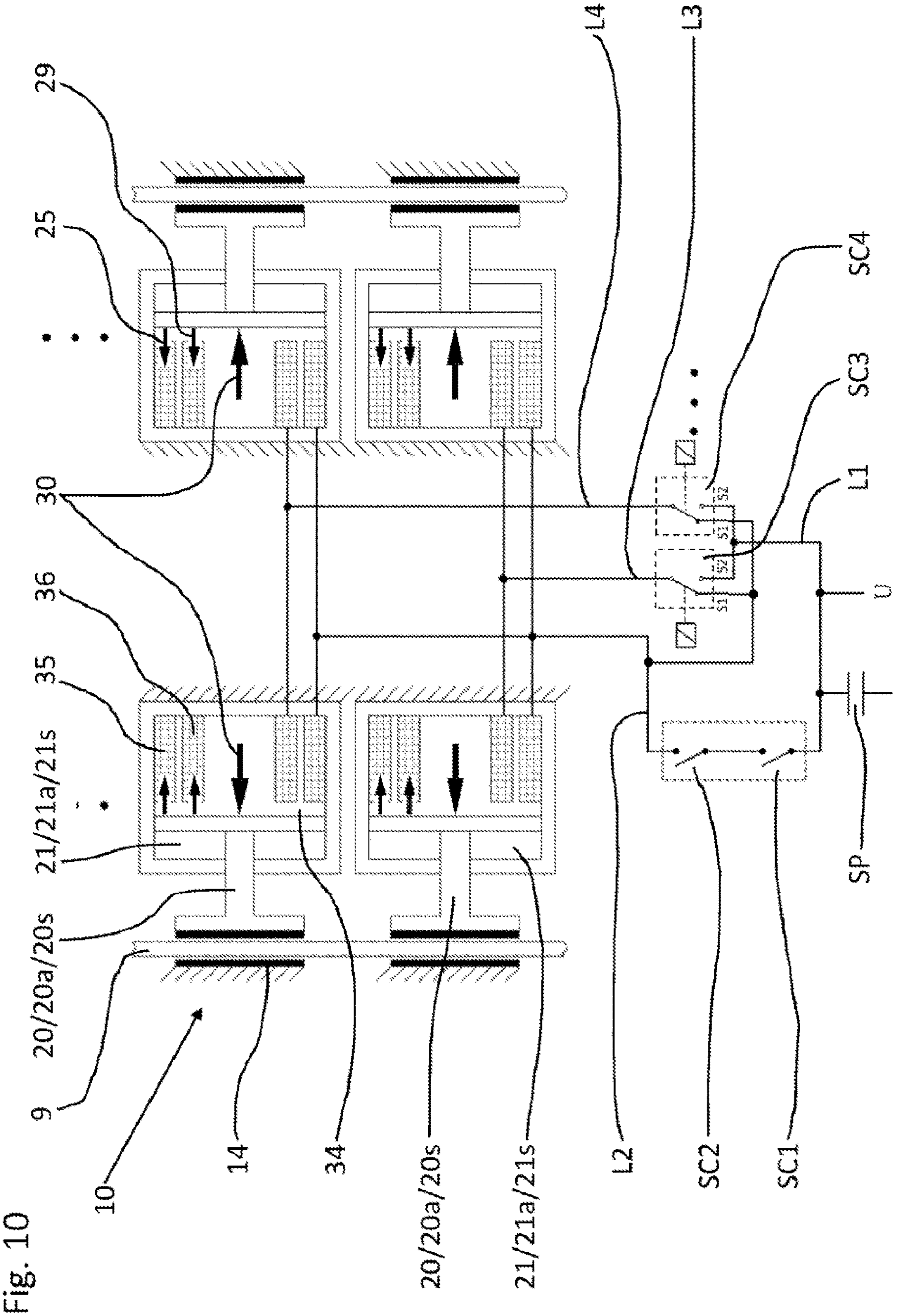
FIG. 10 shows a diagram of a first electrical circuit arrangement according to the invention with an energy storage device and a car brake to be activated, with multiple electromagnets, which each have two coils.

FIG. 10 shows a first circuit arrangement for electrically activating the emergency brake equipped with stepped cylinders (21*s*) and stepped pistons (20*s*), wherein each stepped cylinder (21*s*) assumes the function of a lifting cylinder (21*a*) and of a control cylinder (21), and each stepped piston (20*s*) covers the function of a lifting piston (20*a*) and of a control piston (20). In the diagram, the lift has two guide rails (9), to each of which a car brake (10) is assigned, each having two shown stepped cylinders (21*s*) with stepped pistons (20*s*). It is self-evident that each car brake (10) can also have a greater number of stepped cylinders (21*s*) and stepped pistons (20*s*).

For reasons of uniform distribution of the braking forces to both guide rails (9), equally effective actuators of the brake shown on the left and right are activated by a common line section (L2, L3, L4).

If there is only one guide rail (9) or a greater number of guide rails (9), the number of car brakes (10) can advantageously be reduced or increased accordingly.

In the design shown, each stepped piston (20*s*) has a working magnet (34), which in each case is formed from two magnet coils (35, 36), which in the present example are designed as concentric ring coils.

Each of the stepped pistons (20*s*) is moved towards the guide rail (9) by the force of brake springs (30) and produces a frictional engagement between the guide rail (9) and brake lining (14), as a result of which the car (2) is braked.

The structure of the circuit arrangement is described in the direction of flow of an electrical voltage starting from the voltage supply (U) via energy storage devices (SP) and switches (SC1, SC2) to the car brake (10). The line sections (L1 to L6) are lines for transporting electrical current.

The voltage supply (U) supplies electrical current in a line section (L1), from which an energy storage device (SP) of a secure power supply is also charged. When two switches (SC1, SC2), which are arranged in series for reasons of redundancy, are closed, the current flows from the line section (L1) into a line section (L2) and energises magnet coils (35) of the working magnets (34). Redundancy of the switches (SC1, SC2) is necessary so that safe interruption of the power supply to the magnet coils (35) of the brake is still possible if a switch fails. Moreover, the switches (SC1, SC2) are electrically operated and are held in the closed position electrically.

An alternative to redundancy can be a safe switch (SC1, SC2) with fault exclusion here.

A lifting force (25) directed counter to the brake spring (30) is built up between the working magnet (34) and the stepped piston (20*s*) but is not yet sufficient to open the car brake (10).

The line sections (L3, L4) are also connected to the line section (L2) via the cascade control switches (SC3, SC4) in the first switch position (S1), as a result of which the magnet coils (36) are also energised and generate a control force (29) on the stepped pistons (20*s*), which is added to the lifting force (25) and thus opens the car brake (10) counter to the brake springs (30).

The cascade control switches (SC3, SC4) are designed to have the same effect, and each cascade control switch (SC3, SC4) activates its own system of magnet coils (36).

Moreover, the cascade control switches (SC3, SC4) are designed as electric changeover switches, which connect the line sections (L3) and (L4) to the line section (L2) when in a first switch position (S1) and to the line section (L1) when in a second switch position (S2).

The cascade control switches are electrically operated and are transferred electrically into the second switch position (S2).

It is conceivable to expand the number of cascade control switches (SC3, SC4) to a number "n" and thus activate a number of "n" systems, each consisting of control cylinder (21) and control piston (20), these forming a portion of the stepped cylinders (21*s*) and stepped pistons (20*s*).

During normal operation of the lift system (AS), the cascade control switches (SC3, SC4) are in their first switch position (S1), and the car brake (10) can be completely closed or opened solely by opening or closing the switches (SC1, SC2).

The operating principle of the circuit arrangement is described below using FIG. 10 and FIG. 8, the starting state being assumed to be a system which was without an external voltage supply (U) over a relatively long period of time.

In this state, the car (2) is at any position in the lift shaft (1) and the region of the car brake (10) acting as the emergency brake is closed by the force of the brake springs (30).

The energy storage device (SP) is charged sufficiently for a failure of the voltage supply (U), and there is no voltage present at the line sections (L2, L3, L4).

The switches (SC1, SC2) are in the open switch position, and the two cascade control switches (SC3, SC4) are in the first switch position (S1).

The lift system (AS) receives a call, and the car (2) should travel to another floor. Before the car (2) begins to move, the following processes, which are referred to below as starting mode 4, run within a short time in the system of the car brake (10):

The voltage supply (U) is activated, and the energy storage device (SP) is fully charged via the line section (L1).

Movements of the brake piston (16) can be triggered by the controller via the brake magnet (31), but these are not discussed in detail here.

The two switches (SC1, SC2) are closed, and the magnet coils (35) of the working magnets (34) exert a lifting force (25) directed counter to the brake spring force (30) on the stepped pistons (20*s*).

The line sections (L3, L4) are energised via the cascade control switches (SC3, SC4) in their first switch position (S1), and the magnet coils (36) of the working magnets (34) exert a further control force (29) directed counter to the brake spring force (30) on the stepped pistons (20*s*).

The lifting force (25) and the control force (29) are added to form a total force which is greater than the brake spring force (30) directed in the opposite direction, as a result of which the car brake (10) is opened.

The drive then moves the car (2) to the desired floor.

When the desired floor is reached and the drive comes to a standstill, the following two options for holding the car safely at the target floor, which are referred to as normal mode 7, are possible in the system of the car brake (10):

First Option for Holding the Car by Means of the Operational Brake:

Via a circuit system (not shown), an electrical voltage is applied to the brake coils (33) of the brake magnets (31), and the brake pistons (16) close the car brake (10) counter to the force of the restoring springs (19). The voltage supply (U) is maintained, the switches (SC1, SC2) remain closed, and the cascade control switches (SC3, SC4) remain in their first switch position (S1), as a result of which the stepped pistons (20*s*) remain in their open position counter to the force of the brake springs (30).

Second Option for Holding the Car by Means of the Emergency Brake:

The car brake does not have a separate region provided as an operational brake, or this is not used.

The switches (SC1, SC2) are opened, and the cascade control switches (SC3, SC4) remain in their first switch position (S1), as a result of which the line sections (L2, L3, L4) become de-energised, and as a result of which the lifting force (25) and the control force (29) of the working magnets (34) are removed, and as a result of which the car (2) is then held by the full force of the brake springs (30).

When the lift is called again, one of the processes referred to below as normal mode 8 can run in the system of the car brake (10):

First Option for Opening the Car Brake Via the Operational Brake:

Via a circuit system (not shown), the voltage supply of the brake coils (33) and of the brake magnets (31) is interrupted, and the car brake (10) is opened by the force of the restoring springs (19).

The voltage supply (U) is maintained, and the switches (SC1, SC2) remain closed, and the cascade control switches (SC3, SC4) remain in their first switch position (S1), as a result of which the stepped pistons (20*s*) remain in their open position counter to the force of the brake springs (30).

Second Option for Opening the Car Brake by Means of the Emergency Brake:

The car brake does not have a separate region provided as an operational brake, or this is not used.

The switches (SC1, SC2) are closed, and the cascade control switches (SC3, SC4) remain in their first switch position (S1), as a result of which the line sections (L2, L3, L4) are supplied with an electrical voltage, and as a result of which the lifting force (25) and the control force (29) of the working magnets (34) overcome the force of the brake springs (30), and the stepped pistons (20*s*) with the brake linings (14) lift off from the guide rail.

The drive then moves the car (2) to the desired floor.

If there is a power failure while the car is travelling, emergency braking, which is referred to below as emergency braking 7, is initiated by the car brake (10):

The energy supply of the system can still be ensured for a short time even after failure of the voltage supply (U) by means of the energy storage device (SP) as a secure power supply.

As a result of the absence of the voltage supply (U), the switches (SC1, SC2) open, and the magnet coils (35) of the working magnets (34) become currentless, as a result of which the lifting force (25) acting counter to the brake spring force (30) stops.

The cascade control switches (SC3, SC4) remain in their first switch position (S1), as a result of which the line sections (L3, L4) are likewise currentless, as a result of which the control force (29) acting counter to the brake spring force (30) then also stops, and as a result of which the maximum brake force is built up and the car (2) is decelerated to a maximum extent.

During emergency braking, the cascade control switches (SC3, SC4) are activated via a secure power supply, for example by the energy storage device (SP) in combination with a secure acceleration measurement. The secure power supply in combination with the secure acceleration measurement brings the cascade control switches (SC3, SC4) into the second switch position (S2) or not as required, depending on whether certain threshold values for the deceleration of the car (2) are complied with or exceeded, in the manner described below.

If the deceleration is correct, both cascade control switches (SC3, SC4) remain in their first switch position (S1).

When a first threshold of the deceleration is exceeded, one of the cascade control switches (SC3, SC4) is transferred into its second switch position (S2) and energises some of the magnet coils (36).

When a second threshold of the deceleration is exceeded, both cascade control switches (SC3, SC4) are transferred into their second switch position (S2) and supply a larger number of the magnet coils (36).

It is likewise conceivable to activate magnet coils of different strengths with the cascade control switches (SC3, SC4) and achieve a maximum number of control stages by advantageous staggering.

With two cascade control switches (SC3, SC4) the following stages are accordingly possible at most: 0-SC3-SC4-SC3+SC4.

With a higher number of cascade control switches (SC3, SC4), the number of control stages increases.

A control force (29) directed counter to the brake spring force (30) is thus built up by no magnet coils (36) or only some of the magnet coils (36) supplied by the cascade control switches (SC3, SC4) or all the magnet coils (36) of the working magnets (34) supplied by the cascade control switches (SC3, SC4), and the deceleration is controlled in this manner.

If the deceleration falls below a prescribed minimum owing to the switchover of the cascade control switches (SC3, SC4), this is detected by the acceleration measurement, and at least some of the cascade control switches (SC3, SC4) are transferred back into the first switch position (S1).

If the lift system (AS) is driven by means of linear motor and does not have a counterweight, no emergency braking may take place while the car (2) is travelling upwards.

Therefore, in such a lift system (AS), the line section (L2) can additionally be provided with a cascade control switch (SCn) so that, when an emergency braking criterion is present during upward movement, all the cascade control switches (SC3, SC4, SCn) are in the second switch position (S2), and the line section (L2) is in principle energised as long as the car is moving upwards during emergency braking. As a result, no unnecessary loads are exerted on the passengers during emergency braking when the car (2) is moving upwards.

Furthermore, the control of the deceleration during emergency braking can be improved further on the basis of a measurement of the car loading, carried out before the car (2) starts to travel. To this end, it is possible, for example if car loading is low, to transfer at least some of the cascade control switches (SC3, SC4) immediately into the second switch position (S2) via the secure power supply, even before beginning to travel, in case of later emergency braking, to build up a defined control force (29) by energising at least some of the magnet coils (36) and thereby to reduce the first impact when the car brake (10) engages during emergency braking.

In particular for emergency braking while travelling downwards, the magnet coils (36) of the car brake (10) can advantageously be dimensioned such that, when the maximum system voltage acts on the magnet coil (36), the car brake cannot open fully, but at least a residual braking force (=brake spring force (30) minus control force (29)) always acts on the brake linings (14).

The described control process, which is fed solely by the energy of a secure power supply, takes place multiple times at very short time intervals and is concluded after a few seconds, until the car (2) is at a standstill.

If an overspeed or another fault is detected while the car (2) is travelling, a cycle referred to as emergency braking 8 is triggered, in which the supply voltage (U) can be interrupted and which then proceeds correspondingly to the described emergency braking 7.

After one of the described emergency braking processes and after the corresponding fault causes have been rectified, the system can be put back into operation according to the procedure of starting mode 4.

Figure 11:
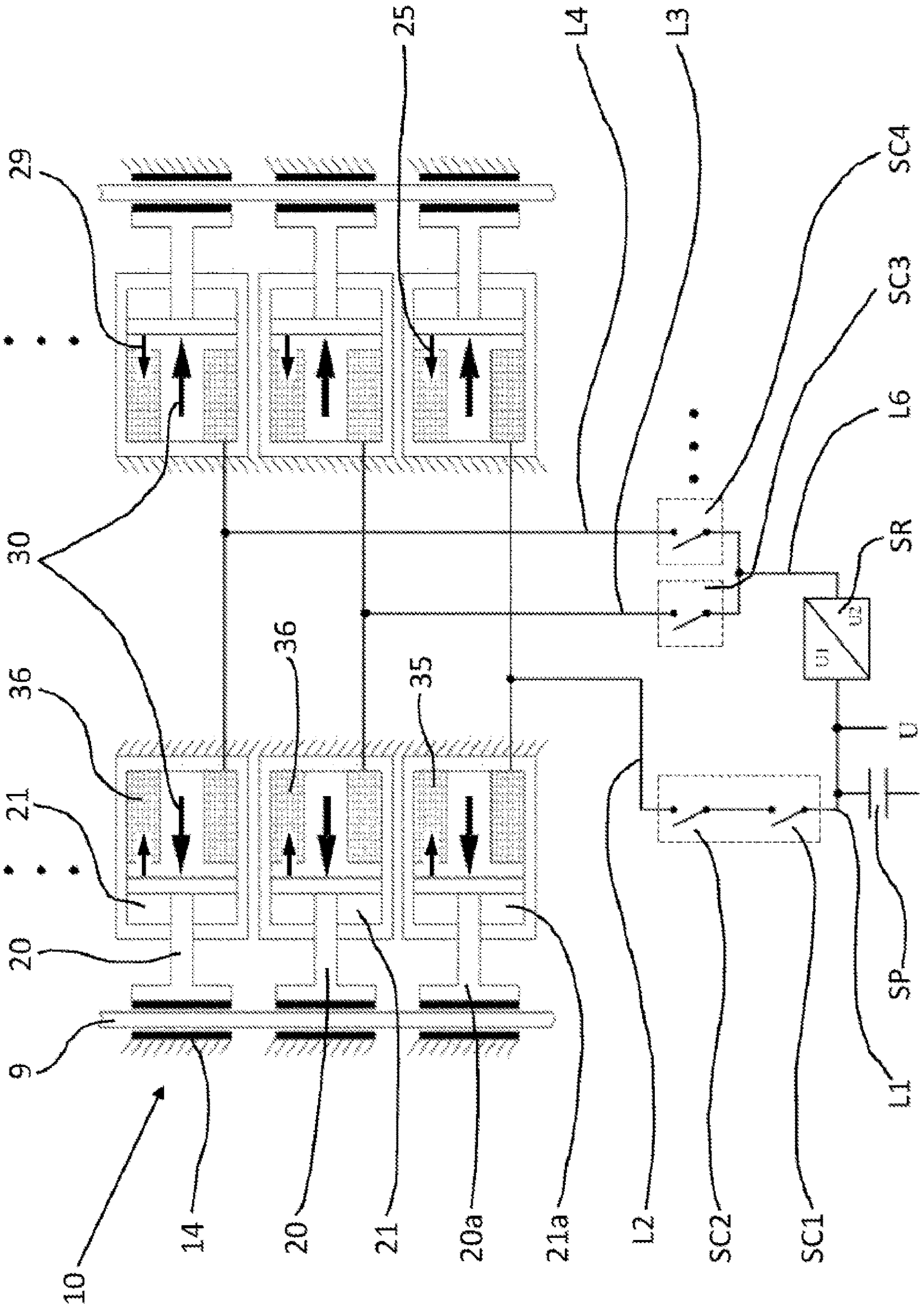
FIG. 11 shows a diagram of a second electrical circuit arrangement according to the invention with an energy storage device and a car brake to be activated, with multiple electromagnets, which each have only one coil.

FIG. 11 shows a second circuit arrangement for electrically activating the emergency brake equipped with control cylinders (21) and control pistons (20) according to FIG. 9.

In the diagram, the lift has two guide rails (9), each of which is assigned a car brake (10), each having two shown control cylinders (21) with control pistons (20) and each having a shown lifting cylinder (21*a*) with a lifting piston (20*a*). It is self-evident that each car brake (10) can also have a greater number of control cylinders (21) and lifting cylinders (21*a*).

For reasons of uniform distribution of the braking forces to both guide rails (9), equally effective actuators of the brake shown on the left and right are activated by a common line section (L2, L3, L4).

If there is only one guide rail (9) or a greater number of guide rails (9), the number of car brakes (10) can advantageously be reduced or increased accordingly.

In the design shown, each control piston (20) has a working magnet (34) having in each case one magnet coil (36), which in the present example is designed as a concentric ring coil.

Each of the lifting pistons (20*a*) is likewise assigned a working magnet (34) having in each case one concentric magnet coil (35).

Each of the control pistons (20) and lifting pistons (20*a*) is moved towards the guide rail (9) by the force of brake springs (30) and produces a frictional engagement between the guide rail (9) and brake lining (14), as a result of which the car (2) is braked.

The structure of the circuit arrangement is described in the direction of flow of an electrical voltage starting from the voltage supply (U) via energy storage devices (SP) and switches (SC1, SC2) to the car brake (10). The line sections (L1 to L6) are lines for transporting electrical current.

The voltage supply (U) supplies electrical current in a line section (L1), from which an energy storage device (SP) of a secure power supply is also charged. Moreover, the line section (L6) is supplied with a reduced electrical voltage via a voltage reduction (SR) from a line section (L1).

When two switches (SC1, SC2), which are arranged in series for reasons of redundancy, are closed, the current flows from the line section (L1) into a line section (L2) and energises magnet coils (35) of the working magnets (34). Redundancy of the switches (SC1, SC2) is necessary so that safe interruption of the power supply to the magnet coils (35) of the brake is still possible if a switch fails. Moreover, the switches (SC1, SC2) are electrically operated and are held electrically in their closed position, safe switches (SC1, SC2) with fault exclusion being conceivable as an alternative.

A lifting force (25) directed counter to the brake spring (30) is built up on the lifting pistons (20*a*) and is greater than the brake spring force (30) but not yet sufficient to open the car brake (10) fully.

For complete opening of the brake, the cascade control switches (SC3, SC4) are closed, as a result of which the magnet coils (36) are also energised and generate a control force (29) on the control pistons (20).

The brake spring force (30) assigned to the control pistons (20) is overcome thereby and thus completely opens the car brake (10).

The cascade control switches (SC3, SC4) are designed to have the same effect in the form of simple normally open contacts, and each cascade control switch (SC3, SC4) activates its own system of magnet coils (36).

Moreover, the switches (SC1, SC2) are also electrically operated and are held in the closed position electrically.

It is conceivable to expand the number of cascade control switches (SC3, SC4) to a number "n" and thus activate a number of "n" systems, each consisting of control cylinder (21) and control piston (20).

The car brake (10) can be completely closed again by opening the switches (SC1, SC2) and the cascade control switches (SC3, SC4, SCn).

The operating principle of the circuit arrangement is described below using FIG. 11 and FIG. 9, the starting state being assumed to be a system which was without an external voltage supply (U) over a relatively long period of time.

In this state, the car (2) is at any position in the lift shaft (1) and the region of the car brake (10) acting as the emergency brake is closed by the force of the brake springs (30).

The energy storage device (SP) is charged sufficiently for a failure of the voltage supply (U), and there is no voltage present at the line sections (L2, L3, L4). The switches (SC1, SC2) and the two cascade control switches (SC3, SC4) are in the open switch position.

The lift system (AS) receives a call, and the car (2) should travel to another floor. Before the car (2) begins to move, the following processes, which are referred to below as starting mode 5, run within a short time in the system of the car brake (10):

- The voltage supply (U) is activated, and the energy storage device (SP) for a secure power supply is fully charged via the line section (L1).
- The line section (L6) is supplied with a reduced voltage at the same time via the voltage reduction (SR).
- Movements of the brake piston (16) can be triggered by the controller via the brake magnet (31), but these are not discussed in detail here.
- The two switches (SC1, SC2) are closed, and the magnet coils (35) of the working magnets (34) exert a lifting force (25) directed counter to the brake spring force (30) on the lifting pistons (20*a*).
- At the same time, the cascade control switches (SC3, SC4) are closed, and the magnet coils (36) of the working magnets (34) exert a further control force (29) directed counter to the brake spring force (30) on the control pistons (20).
- The lifting force (25) and the control force (29) overcome the brake spring force (30) directed counter to them on the lifting pistons (20*a*) and control pistons (20), as a result of which the car brake (10) is opened.

The drive then moves the car (2) to the desired floor.

When the desired floor is reached and the drive comes to a standstill, the following two options for holding the car safely at the target floor, which are referred to as normal mode 9, are possible in the system of the car brake (10):

First Option for Holding the Car by Means of the Operational Brake:

Via a circuit system (not shown), an electrical voltage is applied to the brake coils (33) of the brake magnets (31), and the brake pistons (16) close the car brake (10) counter to the force of the restoring springs (19). The voltage supply (U) is maintained, and the switches (SC1, SC2) and the cascade control switches (SC3, SC4) remain closed, as a result of which the control pistons (20) and the lifting pistons (20*a*) remain in their open position counter to the force of the brake springs (30).

Second Option for Holding the Car by Means of the Emergency Brake:

- The car brake does not have a separate region provided as an operational brake, or this is not used.
- The switches (SC1, SC2) and the cascade control switches (SC3, SC4) are opened, as a result of which the lifting force (25) on the lifting pistons (20*a*) and the control force (29) on the control pistons (20) are removed, and as a result of which the car (2) is then held by the full force of the brake springs (30).

When the lift is called again, one of the processes referred to below as normal mode 10 can run in the system of the car brake (10):

First Option for Opening the Car Brake Via the Operational Brake:

- Via a circuit system (not shown), the voltage supply of the brake coils (33) and of the brake magnets (31) is interrupted, and the car brake (10) is opened by the force of the restoring springs (19).
- The voltage supply (U) is maintained, and the switches (SC1, SC2) and the cascade control switches (SC3, SC4) remain closed, as a result of which the control pistons (20) and the lifting pistons (20*a*) remain in their open position counter to the force of the brake springs (30).

Second Option for Opening the Car Brake by Means of the Emergency Brake:

- The car brake does not have a separate region provided as an operational brake, or this is not used.
- The switches (SC1, SC2) and the cascade control switches (SC3, SC4) are closed, as a result of which the lifting force (25) of the lifting pistons (20*a*) and the control force (29) of the control pistons (20) overcome the force of the respective brake springs (30), and the control pistons (20) and lifting pistons (20*a*) with the brake linings (14) lift off from the guide rail.

The drive then moves the car (2) to the desired floor.

If there is a power failure while the car is travelling, emergency braking, which is referred to below as emergency braking 9, is initiated by the car brake (10):

- The energy supply of the system can still be ensured for a short time even after failure of the voltage supply (U) by means of the energy storage device (SP) as a secure power supply.
- As a result of the absence of the supply voltage (U), the switches (SC1, SC2) open, and the line section (L2) with the magnet coils (35) on the lifting pistons (20*a*) becomes currentless, as a result of which the lifting force (25) acting counter to the brake spring force (30) stops.
- Owing to the absence of the voltage supply (U), the cascade control switches (SC3, SC4) likewise change to their open position, as a result of which the line sections (L3, L4) and magnet coils (36) are likewise currentless, as a result of which the control force (29) acting counter to the brake spring force (30) then also stops, and as a result of which the maximum brake force is built up and the car (2) is decelerated to a maximum extent.
- During emergency braking, the cascade control switches (SC3, SC4) are activated via a secure power supply, for example by the energy storage device (SP) in combination with a secure acceleration measurement.
- The secure power supply in combination with the secure acceleration measurement brings the cascade control switches (SC3, SC4) into their closed position or not as required, depending on whether certain threshold values for the deceleration of the car (2) are complied with or exceeded, in the manner described below.

If the deceleration is correct, both cascade control switches (SC3, SC4) remain open.

When a first threshold of the deceleration is exceeded, one of the cascade control switches (SC3, SC4) is closed and energises some of the magnet coils (36) as a result.

When a second threshold of the deceleration is exceeded, both cascade control switches (SC3, SC4) are closed and supply a larger number of the magnet coils (36).

It is likewise conceivable to activate magnet coils of different strengths with the cascade control switches (SC3, SC4) and achieve a maximum number of control stages by advantageous staggering.

With two cascade control switches (SC3, SC4) the following stages are accordingly possible at most: 0-SC3-SC4-SC3+SC4.

With a higher number of cascade control switches (SC3, SC4), the number of control stages increases.

A control force (29) directed counter to the brake spring force (30) is thus built up by no magnet coils (36) or only some of the magnet coils (36) supplied by the cascade control switches (SC3, SC4) or all the magnet coils (36) of the working magnets (34) supplied by the cascade control switches (SC3, SC4), and the deceleration is controlled in this manner.

If the deceleration falls below a prescribed minimum owing to the closing of the cascade control switches (SC3, SC4), this is detected by the acceleration measurement, and at least some of the cascade control switches (SC3, SC4) are opened again.

If the lift system (AS) is driven by means of linear motor and does not have a counterweight, no emergency braking may take place while the car (2) is travelling upwards.

Therefore, in such a lift system (AS), the line section (L2) can additionally be energised via a cascade control switch (SCn) so that, when an emergency braking criterion is present during upward movement, all the cascade control switches (SC3, SC4, SCn) are closed, and the line section (L2) is in principle energised as long as the car is moving upwards during emergency braking. As a result, no unnecessary loads are exerted on the passengers during emergency braking when the car (2) is moving upwards.

Furthermore, the control of the deceleration during emergency braking can be improved further on the basis of a measurement of the car loading, carried out before the car (2) starts to travel. To this end, it is possible, for example if car loading is low, to close at least some of the cascade control switches (SC3, SC4) again immediately via the secure power supply, before beginning to travel, in case of later emergency braking, to build up a defined control force (29) by energising at least some of the magnet coils (36) and thereby to reduce the first impact considerably when the car brake (10) engages during actual emergency braking.

In particular for emergency braking while travelling downwards, the magnet coils (36) of the car brake (10) can advantageously be dimensioned such that, when the voltage reduced by the voltage reduction (SR) in the line section (L6) acts on the magnet coil (36), the car brake cannot open fully, but at least a residual braking force (=brake spring force (30) minus control force (29)) always acts on the brake linings (14).

The described control process, which is fed solely by the energy of a secure power supply, takes place multiple times at very short time intervals and is concluded after a few seconds, until the car (2) is at a standstill.

If an overspeed or another fault is detected while the car (2) is travelling, a cycle referred to as emergency braking 10 is triggered, in which the supply voltage (U) can be interrupted and which then proceeds correspondingly to the described emergency braking 9.

After one of the described emergency braking processes and after the corresponding fault causes have been rectified, the system can be put back into operation according to the procedure of starting mode 5.

An externally powered car brake (10) for a lift system and, for the activation thereof, a circuit arrangement with integrated stepped control of the deceleration of the car (2) during emergency braking are proposed.

The control is designed such that the deceleration of the car (2) is always within predefined threshold values, which applies independently of the direction of travel of the lift car, independently of the drive system of the lift used, and independently of the car loading and of the friction coefficient between the brake lining (14) and the guide rail (9).

To this end, a braking system having a preset braking force adapted to the operating parameters or the full braking force and a subsequent rapid control of the deceleration on the basis of an acceleration measurement with stepped reduction of the braking force are proposed. The high speed and the quality of the control are achieved in that, during build-up of the control forces (29) and lifting forces (25) acting counter to the brake spring force (30), only very small volumetric flows of the pressure medium or very low currents from the voltage supply are necessary, and essentially only forces are controlled. The entire circuit arrangement and the method can be constructed such that a technically secure system results.

As mentioned in the introduction, the car brake (10) according to the invention and the corresponding circuit arrangement means that a first brake system (7) on the traction sheave (5) can be omitted.

Equally, the use of the car brake (10) and circuit arrangement according to the invention means that it is conceivable also to omit traction sheave (5), supporting means (4) and counterweight (3), when the movement of the car (2) is implemented by means of an alternative drive system, for example linear motors.

Furthermore, the arrangement according to the invention can be used to implement lifts for high conveying heights and speeds without compromising on safety or travelling comfort.

Further combinations of features of the invention can be found in the following paragraphs 1-22 at the end of this description and in claims 1-16; possible combinations of features are not limited to the examples in the description or claims.

Rather, it is conceivable to combine features of pressure-medium-operated elements practically with features of electrically operated elements, both in the region of the circuit arrangement and in the car brakes (10).

Paragraph 1 Car brake (10) and circuit arrangement for activating the emergency braking function of an externally powered car brake (10) of a lift system (AS), the circuit arrangement and the car brake (10) being built directly on a car (2), the car brake (10) having, for providing the emergency braking function, at least one control piston (20) and/or lifting piston (20*a*), on which a brake spring force (30) acts, which exerts a brake force on a guide rail (9) via at least one lining support (15) provided with a brake lining (14) and thus generates a deceleration force on the car (2) in the direction of travel (M), the at least one control piston (20) and/or lifting piston (20*a*) each being mounted in a control cylinder (21) or lifting cylinder (21*a*) and being loadable with external energy such that the car brake (10) is opened counter to the brake spring force (30), the circuit arrangement having a pressure supply (P) or a voltage supply (U), from which a line section (L1) with a pressure reservoir (D1) or an energy storage device (SP) is supplied, the car brake (10) being opened via at least one magnetic directional valve (V1, V2) or at least one switch (SC1, SC2), a line section (L2) and at least one downstream cascade control valve (V5, V6, Vn) in a first switch position (S1) or at least one downstream cascade control switch (SC3, SC4, SCn) in a first switch position (S1) or at least one cascade control switch (SC3, SC4, SCn) in the form of a normally open contact in a closed switch position, characterised in that during emergency braking, the line section (L2) and the line sections (L3, L4) are initially decoupled from the external energy via the at least one magnetic directional valve (V1, V2) or the at least one switch (SC1, SC2), that, if the deceleration of the car (2) is impermissibly high, at least one of the cascade control valves (V5, V6, Vn) or at least one of the cascade control switches (SC1, SC2) changes into the second switch position (S2), and that the energy in the external energy storage device (D1, D2, SP) generates a control force (29) directed counter to the brake spring force (30) by control piston (20).

Paragraph 2 Car brake (10) and circuit arrangement for activating the emergency braking function of an externally powered car brake (10) of a lift system (AS) according to paragraph 1, characterised in that the circuit arrangement and the car brake (10) are designed to be operated by pressure media and are preferably operated with a hydraulic fluid.

Paragraph 3 Car brake and circuit arrangement according to paragraphs 1 and 2, characterised in that at least two redundant parallel-connected return valves (V3, V4) or at least one secure valve with fault exclusion and at least one magnetic directional valve (V1, V2) connected parallel thereto are provided for connection between line section (L1) and line section (L2).

Paragraph 4 Car brake and circuit arrangement according to paragraphs 1 to 3, characterised in that the at least one magnetic directional valve (V1, V2) is series-connected to a throttle valve (DR).

Paragraph 5 Car brake and circuit arrangement according to paragraphs 1 and 2, characterised in that at least two redundant parallel-connected magnetic directional valves (V1, V2) or at least one secure valve with fault exclusion are provided for connecting line section (L1) and line section (L2).

Paragraph 6 Car brake and circuit arrangement according to at least one of the preceding paragraphs, characterised in that, starting from the line section (L2), a first cascade control valve (V5) is installed towards the line section (L3) and a second cascade control valve (V6) is installed towards the line section (L4).

Paragraph 7 Car brake and circuit arrangement according to at least one of the preceding paragraphs, characterised in that in addition to the cascade control valves (V5, V6), further cascade control valves (Vn) are provided between the line section (L2) and further line sections (Ln) to supply further control piston chambers (26).

Paragraph 8 Car brake and circuit arrangement according to at least one of the preceding paragraphs, characterised in that at least one car brake (10) is built onto the car (2), and that the car brake (10) has at least one functional region, which is designed to carry out emergency braking or operational braking.

Paragraph 9 Car brake and circuit arrangement according to at least one of the preceding paragraphs, characterised in that the functional region which is designed to carry out emergency braking or operational braking has at least one stepped control cylinder (21) with a control piston (21) accommodated therein, which in each case together form a lifting piston chamber (22) and a control piston chamber (26).

Paragraph 10 Car brake and circuit arrangement according to at least one of the preceding paragraphs, characterised in that the functional region which is designed to carry out emergency braking or operational braking has, arranged adjacently to each other in the direction of travel (M) of the car (2), at least one single-stage lifting cylinder (21*a*) with a lifting piston (20*a*) accommodated therein and at least one control cylinder (21) with a control piston (21) accommodated therein, wherein the lifting cylinder (21*a*) and the lifting piston (20*a*) together form a lifting piston chamber (22) in each case, and wherein the control cylinder (21) and the control piston (20) together form a control piston chamber (26) in each case.

Paragraph 11 Car brake and circuit arrangement according to at least one of the preceding paragraphs, characterised in that the lifting piston chambers (22) are activated directly via the line section (L2), and that at least one control piston chamber (26) is assigned to each of the line sections (L3, L4, Ln).

Paragraph 12 Car brake and circuit arrangement according to at least one of the preceding paragraphs, characterised in that in at least one additional cascade control valve (V5, V6, Vn) is arranged between the line section (L2) and the at least one lifting piston chamber (22).

Paragraph 13 Car brake and circuit arrangement according to at least one of the preceding paragraphs, characterised in that, when the car (2) begins to travel, switching logic calculates an optimal strategy for activating the cascade control valves (V5, V6, Vn) on the basis of the direction of movement and/or the loading state of the car (2) and on the basis of preset values for achieving optimal deceleration in the event of emergency braking and retrieves said strategy in the event of actual emergency braking.

Paragraph 14 Car brake (10) and circuit arrangement for activating the emergency braking function of an externally powered car brake (10) of a lift system (AS) according to paragraph 1, characterised in that the circuit arrangement and the car brake (10) are designed for electrical operation.

Paragraph 15 Car brake and circuit arrangement according to paragraphs 1 and 15, characterised in that at least two redundant electrical switches (SC1, SC2) arranged in series or a safe switch with fault exclusion are provided for connection between line section (L1) and line section (L2).

Paragraph 16 Car brake and circuit arrangement according to at least one of the preceding paragraphs, characterised in that, starting from the line section (L2), a first cascade control switch (SC3) is installed towards the line section (L3) and a second cascade control switch (SC4) is installed towards the line section (L4).

Paragraph 17 Car brake and circuit arrangement according to at least one of the preceding paragraphs, characterised in that in addition to the cascade control switches (SC3, SC4), further cascade control switches (SCn) are provided between the line section (L1) or the line section (L2) and further line sections (Ln) to supply further control pistons (20) with magnet coils (36).

Paragraph 18 Car brake and circuit arrangement according to at least one of the preceding paragraphs, characterised in that the functional region which is designed to carry out emergency braking or operational braking has at least one control cylinder (21) with a control piston (20) accommodated therein, wherein each control piston (20) generates a braking effect between car (2) and guide rail (9) by means of brake spring force (30), and wherein each control piston (20) is movable counter to the brake spring force (30) by means of at least two independent magnet coils (35, 36).

Paragraph 19 Car brake and circuit arrangement according to at least one of the preceding paragraphs, characterised in that the functional region which is designed to carry out emergency braking or operational braking has, arranged adjacently to each other in the direction of travel (M) of the car (2), at least one single-stage lifting cylinder (21*a*) with a lifting piston (20*a*) accommodated therein and at least one control cylinder (21) with a control piston (20) accommodated therein, wherein the lifting piston (20*a*) and control piston (20) are loaded by brake springs (30), and wherein each lifting piston (20*a*) is movable by a magnet coil (35) and each control piston (20) is movable by a magnet coil (36) counter to the brake spring force (30).

Paragraph 20 Car brake and circuit arrangement according to at least one of the preceding paragraphs, characterised in that the magnet coils (35) of the lifting pistons (20*a*) are activated directly via the line section (L2), and that at least one magnet coil (36) of the control pistons (20) is assigned to each of the line sections (L3, L4, Ln).

Paragraph 21 Car brake and circuit arrangement according to at least one of the preceding paragraphs, characterised in that in an additional cascade control switch (SC3, SC4, SCn) is arranged between the line section (L2) and the magnet coil (35) of the at least one lifting piston (20*a*).

Paragraph 22 Car brake and circuit arrangement according to at least one of the preceding paragraphs, characterised in that, when the car (2) begins to travel, switching logic calculates an optimal strategy for activating the cascade control switches (SC3, SC4, SCn) on the basis of the direction of movement and/or the loading state of the car (2) and on the basis of preset values for achieving optimal deceleration in the event of emergency braking and retrieves said strategy in the event of actual emergency braking.

LIST OF REFERENCE SIGNS

1 Lift shaft
2 Car
3 Counterweight
4 Supporting means
5 Traction sheave
6 Brake disc
7 First brake system
8 Second brake system (safety gear)
9 Guide rail
10 Car brake
11 Brake housing
12 Housing cover
13 Guide element
14 Brake lining
15 Lining support
16 Brake piston
17 Brake cylinder
18 Braking pressure connection
19 Restoring spring
20 Control piston
20*a* Lifting piston
20*s* Stepped piston
21 Control cylinder
21*a* Lifting cylinder
21*s* Stepped cylinder
22 Lifting piston chamber
23 Lifting piston face
24 Lifting pressure connection
25 Lifting force
26 Control piston chamber
27 Control piston face
28 Control pressure connection
29 Control force
30 Brake spring/brake spring force
31 Brake magnet
32 Armature disc
33 Brake coil
34 Working magnet
35 Magnet coil
36 Magnet coil
AS Lift system
D1 Pressure reservoir
D2 Pressure reservoir
DR Throttle valve
L1 Line section
L2 Line section
L3 Line section
L4 Line section
Ln nth line section
L5 Line section
L6 Line section
M Direction of travel (of car and counterweight)
P Pressure supply
R Return (to tank)
R1 Check valve
R2 Check valve
S1 First switch position (of valve or switch)
S2 Second switch position (of valve or switch)
SH Switch monitoring system
SP Energy storage device
SR Voltage reduction
SC1 Switch
SC2 Switch
SC3 First cascade control switch
SC4 Second cascade control switch
SCn nth cascade control switch
U Voltage supply
V1 Magnetic directional valve
V2 Magnetic directional valve
V3 Return valve
V4 Return valve
V5 First cascade control valve
V6 Second cascade control valve
Vn nth cascade control valve
V8 Pressure reduction valve

The invention claimed is:

1. A car brake (10) and circuit arrangement for activating a brake function, in particular an emergency braking function of an externally powered car brake (10), which interacts with at least one guide rail (9), of a lift system (AS), the circuit arrangement and the car brake (10) being built directly on a car (2) of the lift system (AS), the car brake (10) having, for providing the emergency braking function at least in the region of a guide rail (9), at least one lifting piston (20*a*) and at least two control pistons (20), on which a brake spring force (30) acts, which exerts a normal force on the guide rail (9) via at least one lining support (15) provided with a brake lining (14) and thus generates a deceleration force on the car (2) in the direction of travel (M), the at least one lifting piston (20*a*) being designed to provide a first brake force, and the at least two control pistons (20) being designed to provide a second brake force, which is added to the first brake force,p the at least two control pistons (20) and the at least one lifting piston (20*a*) each being mounted in a control cylinder (21) and in a lifting cylinder (21*a*) and being loadable with external energy such that the car brake (10) is opened counter to the brake spring force (30), and the circuit arrangement having a pressure supply (P) or a voltage supply (U), from which a line section (L1) with a pressure reservoir (D1) or an energy storage device (SP) is supplied, wherein, in a first step for opening the car brake (10), the line section (L1) is connected to a line section (L2) via at least one magnetic directional valve (V1, V2) or at least one switch (SC1, SC2), and at least one lifting cylinder (21*a*) is loaded with external energy as a result, and that in a second step for opening the car brake (10), the at least two control cylinders (21) are additionally loaded with external energy by at least two cascade control valves (V5, V6, Vn) or at least two cascade control switches (SC3, SC4, SCn) via line sections (L3, L4, Ln); and characterised in that, during emergency braking according to a first strategy, which requires high braking forces depending on the friction conditions between guide rail (9) and brake linings (14) and on the loading and direction of travel of the car (2), the line section (L2) is decoupled from the external energy via the at least one magnetic directional valve (V1, V2) or the at least one switch (SC1, SC2), and thus a first braking force is generated on the guide rail (9) via the brake spring force (30) of the at least one lifting cylinder (21*a*), that all the line sections (L3, L4, Ln) are decoupled from the external energy simultaneously via the cascade control valves (V5, V6, Vn) or cascade control switches (SC3, SC4, SCn), and a second braking force is generated on the guide rail (9) by all the control cylinders (21) with their brake spring force (30), that the deceleration of the car (2) is measured continuously during emergency braking, that, when predefined threshold values for the deceleration of the car (2) are exceeded, at least one of the control cylinders (21) is supplied with external energy via at least one of the cascade control valves (V5, V6, Vn) or at least one of the cascade control switches (SC3, SC4, SCn), and the braking force is reduced, and that, when the deceleration of the car (2) subsequently falls below predefined threshold values, at least one of the control cylinders (21) is disconnected from the external energy via at least one of the cascade control valves (V5, V6, Vn) or at least one of the cascade control switches (SC3, SC4, SCn), and the braking force is increased.

2. A car brake (10) and circuit arrangement for activating a brake function, in particular an emergency braking function of an externally powered car brake (10), which interacts with at least one guide rail (9), of a lift system (AS) according to claim 1, characterised in that, during emergency braking according to a second strategy, which requires moderate braking forces depending on the friction conditions between guide rail (9) and brake linings (14) and on the loading and direction of travel of the car (2), the line section (L2) is decoupled from the external energy via the at least one magnetic directional valve (V1, V2) or the at least one switch (SC1, SC2), and thus a first braking force is generated on the guide rail (9) via the brake spring force (30) of the at least one lifting cylinder (21*a*), that none or at least one of the line sections (L3, L4, Ln) is decoupled from the external energy simultaneously via the cascade control valves (V5, V6, Vn) or cascade control switches (SC3, SC4, SCn), and thus none or only a reduced second braking force is generated on the guide rail (9), that the deceleration of the car (2) is measured continuously during emergency braking, that, when predefined threshold values for the deceleration of the car (2) are exceeded, none or at least one of the control cylinders (21) is supplied with external energy via none or at least one of the cascade control valves (V5, V6, Vn) or via none or at least one of the cascade control switches (SC3, SC4, SCn), and the braking force is reduced, and that, when the deceleration of the car (2) falls below predefined threshold values, at least one of the control cylinders (21) is disconnected from the external energy via at least one of the cascade control valves (V5, V6, Vn) or at least one of the cascade control switches (SC3, SC4, SCn), and the braking force is increased.

3. The car brake (10) and circuit arrangement according to claim 1, characterised in that, before the car (2) begins to travel, switching logic calculates an optimal strategy for activating the valves (V1, V2, V3, V4) or the switches (SC1, SC2) and the cascade control valves (V5, V6, Vn) or the cascade control switches (SC3, SC4, SCn) on the basis of the direction of movement and/or the loading state of the car (2) and on the basis of preset values for achieving optimal deceleration in the event of emergency braking and retrieves said strategy in the event of actual emergency braking.

4. The car brake (10) and circuit arrangement according to claim 1, characterised in that at least two redundant parallel-connected magnetic directional valves (V1, V2), which are preferably activated together, or at least one magnetic directional valve (V1) with fault exclusion or at least two redundant series-connected switches (SC1, SC2), which are preferably activated together, or at least one safe switch (SC1) with fault exclusion are arranged for connection between the line section (L1) and the line section (L2).

5. The car brake (10) and circuit arrangement according to claim 4, characterised in that the circuit arrangement and the car brake (10) are designed to be operated by pressure media, that a first connection of at least one of the cascade control valves (V5, V6, Vn) is connected downstream of the line section (L2) and is therefore supplied with external energy or is connected to the return (R) via the line section (L5) depending on the switch position of the magnetic directional valves (V1, V2) and/or the return valves (V3, V4), that a second connection of at least one of the cascade control valves (V5, V6, Vn) is supplied with external energy directly via a line section or via a pressure reduction valve (V8) from the line section (L1), and that a third connection of at least one of the cascade control valves (V5, V6, Vn) is connected to one of the control cylinders (21) via a line section (L3, L4, Ln).

6. The car brake (10) and circuit arrangement according to claim 4, characterised in that the circuit arrangement and the car brake (10) are designed to be operated by pressure media, that a first connection of at least one of the cascade control valves (V5, V6, Vn) is connected to the return (R) directly via the line section (L5), that a second connection of at least one of the cascade control valves (V5, V6, Vn) is supplied with external energy directly from the line section (L1) or via the line section (L1), a pressure reduction valve (V8) and a line section (L6), and that a third connection of at least one of the cascade control valves (V5, V6, Vn) is connected to one of the control cylinders (21) via a line section (L3, L4, Ln).

7. The car brake (10) and circuit arrangement according to claim 4, characterised in that the circuit arrangement and the car brake (10) are electrically operated, that a first connection of at least one of the cascade control switches (SC3, SC4, SCn) is connected downstream of the line section (L2) and is therefore supplied with external energy or not depending on the switch position of the switches (SC1, SC2), that a second connection of at least one of the cascade control switches (SC3, SC4, SCn) is supplied with external energy from the line section (L1) directly or via the line section (L1), a voltage reduction (SR) and a line section (L6), and that a third connection of at least one of the cascade control switches (SC3, SC4, SCn) is connected to one of the control cylinders (21) via a line section (L3, L4, Ln).

8. The car brake (10) and circuit arrangement according to claim 4, characterised in that the circuit arrangement and the car brake (10) are electrically operated, that a first connection of at least one of the cascade control switches (SC3, SC4, SCn) is supplied with external energy directly from the line section (L1) or via the line section (L1), a voltage reduction (SR) and a line section (L6), and that a second connection of at least one of the cascade control switches (SC3, SC4, SCn) is connected to one of the control cylinders (21) via a line section (L3, L4, Ln).

9. The car brake (10) and circuit arrangement according to claim 1, characterised in that at least one magnetic directional valve (V1, V2) together with at least two return valves (V3, V4), which are connected parallel thereto and are preferably activated together, or a secure return valve (V3) with fault exclusion are arranged for connection between the line section (L1) and the line section (L2).

10. The car brake (10) and circuit arrangement according to claim 1, characterised in that the line sections (L1, L6) have energy stores, which are designed as energy storage devices (SP), in a circuit arrangement and car brake (10) with electrical operation, and which are preferably designed as pressure reservoirs (D1, D2) in a circuit arrangement and car brake (10) of pressure-medium-operated design.

11. A car brake (10) and circuit arrangement for activating a brake function, in particular an emergency braking function of an externally powered car brake (10), which interacts with at least one guide rail (9), of a lift system (AS), the circuit arrangement and the car brake (10) being built directly on a car (2) of the lift system (AS), the car brake (10) having, for providing the emergency braking function at least in the region of a guide rail (9), at least one lifting piston (20*a*) and at least two control pistons (20), on which a brake spring force (30) acts, which exerts a normal force on the guide rail (9) via at least one lining support (15) provided with a brake lining (14) and thus generates a deceleration force on the car (2) in the direction of travel (M), the at least one lifting piston (20*a*) being designed to provide a first brake force, and the at least two control pistons (20) being designed to provide a second brake force, which is added to the first brake force, the at least two control pistons (20) and the at least one lifting piston (20*a*) each being mounted in a control cylinder (21) and in a lifting cylinder (21*a*) and being loadable with external energy such that the car brake (10) is opened counter to the brake spring force (30), and the circuit arrangement having a pressure supply (P) or a voltage supply (U), from which a line section (L1) with a pressure reservoir (D1) or an energy storage device (SP) is supplied, wherein, in a first step for opening the car brake (10), the line section (L1) is connected to a line section (L2) via at least one magnetic directional valve (V1, V2) or at least one switch (SC1, SC2), and at least one lifting cylinder (21*a*) is loaded with external energy as a result, and that in a second step for opening the car brake (10), the at least two control cylinders (21) are additionally loaded with external energy by at least two cascade control valves (V5, V6, Vn) or at least two cascade control switches (SC3, SC4, SCn) via line sections (L3, L4, Ln), and characterised in that, during emergency braking according to a third strategy, which requires no braking forces depending on the friction conditions between guide rail (9) and brake linings (14) and on the loading and direction of travel of the car (2), the line section (L2) is further supplied with external energy via the at least one magnetic directional valve (V1, V2) or the at least one switch (SC1, SC2), and thus a first braking force is not generated, that none of the line sections (L3, L4, Ln) is decoupled from the external energy simultaneously via the cascade control valves (V5, V6, Vn) or cascade control switches (SC3, SC4, SCn), and thus no second braking force is generated on the guide rail (9), that the direction of travel of the car (2) is monitored continuously during emergency braking, and that when the direction of movement of the car (2) reverses, the line section (L2) is decoupled from the external energy via the at least one magnetic directional valve (V1, V2) or the at least one switch (SC1, SC2), and thus a first braking force is generated on the guide rail (9) via the brake spring force (30) of the at least one lifting cylinder (21*a*), and/or at least one of the control cylinders (21) is decoupled from the external energy via at least one of the cascade control valves (V5, V6, Vn) or at least one of the cascade control switches (SC3, SC4, SCn), and a second braking force is generated on the guide rail.

12. The car brake (10) and circuit arrangement according to claim 11, characterised in that, before the car (2) begins to travel, switching logic calculates an optimal strategy for activating the valves (V1, V2, V3, V4) or the switches (SC1, SC2) and the cascade control valves (V5, V6, Vn) or the cascade control switches (SC3, SC4, SCn) on the basis of the direction of movement and/or the loading state of the car (2) and on the basis of preset values for achieving optimal deceleration in the event of emergency braking and retrieves said strategy in the event of actual emergency braking.

13. The car brake (10) and circuit arrangement according to claim 11, characterised in that at least two redundant parallel-connected magnetic directional valves (V1, V2), which are preferably activated together, or at least one magnetic directional valve (V1) with fault exclusion or at least two redundant series-connected switches (SC1, SC2), which are preferably activated together, or at least one safe switch (SC1) with fault exclusion are arranged for connection between the line section (L1) and the line section (L2).

14. The car brake (10) and circuit arrangement according to claim 13, characterised in that the circuit arrangement and the car brake (10) are designed to be operated by pressure media, that a first connection of at least one of the cascade control valves (V5, V6, Vn) is connected downstream of the line section (L2) and is therefore supplied with external energy or is connected to the return (R) via the line section (L5) depending on the switch position of the magnetic directional valves (V1, V2) and/or the return valves (V3, V4), that a second connection of at least one of the cascade control valves (V5, V6, Vn) is supplied with external energy directly via a line section or via a pressure reduction valve (V8) from the line section (L1), and that a third connection of at least one of the cascade control valves (V5, V6, Vn) is connected to one of the control cylinders (21) via a line section (L3, L4, Ln).

15. The car brake (10) and circuit arrangement according to claim 13, characterised in that the circuit arrangement and the car brake (10) are designed to be operated by pressure media, that a first connection of at least one of the cascade control valves (V5, V6, Vn) is connected to the return (R) directly via the line section (L5), that a second connection of at least one of the cascade control valves (V5, V6, Vn) is supplied with external energy directly from the line section (L1) or via the line section (L1), a pressure reduction valve (V8) and a line section (L6), and that a third connection of at least one of the cascade control valves (V5, V6, Vn) is connected to one of the control cylinders (21) via a line section (L3, L4, Ln).

16. The car brake (10) and circuit arrangement according to claim 13, characterised in that the circuit arrangement and the car brake (10) are electrically operated, that a first connection of at least one of the cascade control switches (SC3, SC4, SCn) is connected downstream of the line section (L2) and is therefore supplied with external energy or not depending on the switch position of the switches (SC1, SC2), that a second connection of at least one of the cascade control switches (SC3, SC4, SCn) is supplied with external energy from the line section (L1) directly or via the line section (L1), a voltage reduction (SR) and a line section (L6), and that a third connection of at least one of the cascade control switches (SC3, SC4, SCn) is connected to one of the control cylinders (21) via a line section (L3, L4, Ln).

17. The car brake (10) and circuit arrangement according to claim 13, characterised in that the circuit arrangement and the car brake (10) are electrically operated, that a first connection of at least one of the cascade control switches (SC3, SC4, SCn) is supplied with external energy directly from the line section (L1) or via the line section (L1), a voltage reduction (SR) and a line section (L6), and that a second connection of at least one of the cascade control switches (SC3, SC4, SCn) is connected to one of the control cylinders (21) via a line section (L3, L4, Ln).

18. The car brake (10) and circuit arrangement according to claim 11, characterised in that at least one magnetic directional valve (V1, V2) together with at least two return valves (V3, V4), which are connected parallel thereto and are preferably activated together, or a secure return valve (V3) with fault exclusion are arranged for connection between the line section (L1) and the line section (L2).

19. The car brake (10) and circuit arrangement according to claim 11, characterised in that the line sections (L1, L6) have energy stores, which are designed as energy storage devices (SP), in a circuit arrangement and car brake (10) with electrical operation, and which are preferably designed as pressure reservoirs (D1, D2) in a circuit arrangement and car brake (10) of pressure-medium-operated design.

20. A car brake (10) and circuit arrangement for activating a brake function, in particular an emergency braking function of an externally powered car brake (10), which interacts with at least one guide rail (9), of a lift system (AS) according to claim 4, characterised in that, during emergency braking according to a second strategy, which requires moderate braking forces depending on the friction conditions between guide rail (9) and brake linings (14) and on the loading and direction of travel of the car (2), the line section (L2) is decoupled from the external energy via the at least one magnetic directional valve (V1, V2) or the at least one switch (SC1, SC2), and thus a first braking force is generated on the guide rail (9) via the brake spring force (30) of the at least one lifting cylinder (21*a*), that none or at least one of the line sections (L3, L4, Ln) is decoupled from the external energy simultaneously via the cascade control valves (V5, V6, Vn) or cascade control switches (SC3, SC4, SCn), and thus none or only a reduced second braking force is generated on the guide rail (9), that the deceleration of the car (2) is measured continuously during emergency braking, that, when predefined threshold values for the deceleration of the car (2) are exceeded, none or at least one of the control cylinders (21) is supplied with external energy via none or at least one of the cascade control valves (V5, V6, Vn) or via none or at least one of the cascade control switches (SC3, SC4, SCn), and the braking force is reduced, and that, when the deceleration of the car (2) falls below predefined threshold values, at least one of the control cylinders (21) is disconnected from the external energy via at least one of the cascade control valves (V5, V6, Vn) or at least one of the cascade control switches (SC3, SC4, SCn), and the braking force is increased.

* * * * *